United States Patent
Jen et al.

(10) Patent No.: US 10,755,275 B1
(45) Date of Patent: Aug. 25, 2020

(54) INTELLIGENT CAPTURE IN MIXED FULFILLMENT TRANSACTIONS

(71) Applicant: Square, Inc., San Francisco, CA (US)

(72) Inventors: Mark Jen, San Francisco, CA (US); Gillian May Lian Wee, San Francisco, CA (US); Taylor Caswell Cascino, San Francisco, CA (US); Grace Huey Chen, San Francisco, CA (US); Benjamin Hartard, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 171 days.

(21) Appl. No.: 15/662,998

(22) Filed: Jul. 28, 2017

Related U.S. Application Data

(63) Continuation of application No. 14/701,571, filed on May 1, 2015, now Pat. No. 9,721,251.

(51) Int. Cl.
   *G07G 1/12* (2006.01)
   *G06Q 20/40* (2012.01)
   *G06Q 30/06* (2012.01)
   *G06Q 20/20* (2012.01)

(52) U.S. Cl.
   CPC ........... *G06Q 20/40* (2013.01); *G06Q 20/209* (2013.01); *G06Q 20/407* (2013.01); *G06Q 30/0633* (2013.01)

(58) Field of Classification Search
   CPC .................................................... G06Q 20/40
   USPC ..................................................... 705/16, 24
   See application file for complete search history.

(56) References Cited

U.S. PATENT DOCUMENTS

| | | | |
|---|---|---|---|
| 5,652,421 | A | 7/1997 | Veeneman et al. |
| 5,878,337 | A | 3/1999 | Joao et al. |
| 5,960,411 | A | 9/1999 | Hartman et al. |
| 6,154,738 | A | 11/2000 | Call |
| 6,263,352 | B1 | 7/2001 | Cohen |
| 6,330,544 | B1 | 12/2001 | Walker et al. |
| 7,085,812 | B1 | 8/2006 | Sherwood |
| 7,155,411 | B1 | 12/2006 | Blinn et al. |
| 7,233,843 | B2 | 6/2007 | Budhraja et al. |
| 7,475,024 | B1 | 1/2009 | Phan |

(Continued)

FOREIGN PATENT DOCUMENTS

| | | |
|---|---|---|
| AU | 2017235924 A1 | 10/2017 |
| AU | 2017322412 A1 | 5/2019 |

(Continued)

OTHER PUBLICATIONS

Final Office Action dated Nov. 17, 2017, for U.S. Appl. No. 14/730,860, of Sasmaz, Y., et al., filed Jun. 4, 2015.

(Continued)

*Primary Examiner* — Rokib Masud
(74) *Attorney, Agent, or Firm* — Lee & Hayes, P.C.

(57) ABSTRACT

This disclosure describes techniques for intelligent payment capture in mixed fulfillment transactions. For example, the techniques described herein may include generating a purchase ticket associated with multiple items in a mixed fulfillment transaction. The purchase ticket may facilitate conducting a mixed fulfillment transaction in which a payment instrument is authorized for the cost of the multiple items in the mixed fulfillment transaction, with partial payment captures being made as items are fulfilled without requiring additional authorizations.

20 Claims, 8 Drawing Sheets

(56) References Cited

U.S. PATENT DOCUMENTS

| | | |
|---|---|---|
| 7,478,054 B1 | 1/2009 | Adams et al. |
| 7,493,390 B2 | 2/2009 | Bobde et al. |
| 7,552,087 B2 | 6/2009 | Schultz et al. |
| 7,575,166 B2 | 8/2009 | McNamara |
| 7,603,382 B2 | 10/2009 | Halt, Jr. |
| 7,764,185 B1 | 7/2010 | Manz et al. |
| 7,810,729 B2 | 10/2010 | Morley, Jr. |
| 7,818,809 B1 | 10/2010 | Sobel et al. |
| 7,835,949 B2 | 11/2010 | Tarvydas et al. |
| 8,060,259 B2 | 11/2011 | Budhraja et al. |
| 8,112,066 B2 | 2/2012 | Ayed |
| 8,266,551 B2 | 9/2012 | Boldyrev et al. |
| 8,401,710 B2 | 3/2013 | Budhraja et al. |
| 8,423,459 B1 | 4/2013 | Green et al. |
| 8,434,682 B1 | 5/2013 | Argue et al. |
| 8,498,888 B1 | 7/2013 | Raff et al. |
| 8,577,810 B1 | 11/2013 | Dalit et al. |
| 8,602,296 B1 | 12/2013 | Velline et al. |
| 8,630,586 B2 | 1/2014 | Dvortsov et al. |
| 8,676,119 B2 | 3/2014 | Cohen et al. |
| 8,855,312 B1 | 10/2014 | Hodgman et al. |
| 8,859,337 B2 | 10/2014 | Gaul et al. |
| 8,892,462 B1 | 11/2014 | Borovsky et al. |
| 8,972,298 B2 | 3/2015 | Kunz et al. |
| 9,064,249 B1 | 6/2015 | Borovsky et al. |
| 9,195,985 B2 | 11/2015 | Domenica et al. |
| 9,443,262 B1 | 9/2016 | Mamgain et al. |
| 9,542,681 B1 | 1/2017 | Borovsky et al. |
| 9,652,751 B2 | 5/2017 | Aaron et al. |
| 9,704,146 B1 | 7/2017 | Morgan et al. |
| 9,721,251 B1 | 8/2017 | Jen et al. |
| 2002/0091646 A1 | 7/2002 | Lake et al. |
| 2003/0014317 A1 | 1/2003 | Siegel et al. |
| 2003/0115285 A1 | 6/2003 | Lee et al. |
| 2003/0204447 A1 | 10/2003 | Dalzell et al. |
| 2004/0030601 A1 | 2/2004 | Pond et al. |
| 2004/0193489 A1 | 9/2004 | Boyd et al. |
| 2004/0215520 A1 | 10/2004 | Butler et al. |
| 2005/0055582 A1 | 3/2005 | Bazakos et al. |
| 2005/0246245 A1 | 11/2005 | Satchell et al. |
| 2006/0064373 A1 | 3/2006 | Kelley |
| 2006/0085333 A1 | 4/2006 | Wah et al. |
| 2006/0261149 A1 | 11/2006 | Raghavendra Tulluri |
| 2007/0069013 A1 | 3/2007 | Seifert et al. |
| 2007/0073619 A1 | 3/2007 | Smith |
| 2007/0136140 A1* | 6/2007 | Smith, Jr. .......... G06Q 30/0641 705/80 |
| 2007/0208930 A1 | 9/2007 | Blank et al. |
| 2008/0035725 A1 | 2/2008 | Jambunathan et al. |
| 2008/0037442 A1 | 2/2008 | Bill |
| 2008/0040265 A1 | 2/2008 | Rackley, III et al. |
| 2008/0133351 A1 | 6/2008 | White et al. |
| 2008/0177624 A9 | 7/2008 | Dohse |
| 2008/0197188 A1 | 8/2008 | Jagatic et al. |
| 2008/0262925 A1 | 10/2008 | Kim et al. |
| 2008/0277465 A1 | 11/2008 | Pletz et al. |
| 2008/0296978 A1 | 12/2008 | Finkenzeller et al. |
| 2009/0012865 A1 | 1/2009 | Celik |
| 2009/0070228 A1 | 3/2009 | Ronen |
| 2009/0106138 A1 | 4/2009 | Smith et al. |
| 2009/0112766 A1 | 4/2009 | Hammad et al. |
| 2009/0271265 A1 | 10/2009 | Lay et al. |
| 2009/0288012 A1 | 11/2009 | Hertel et al. |
| 2009/0313132 A1 | 12/2009 | McKenna et al. |
| 2009/0319421 A1 | 12/2009 | Mathis et al. |
| 2010/0076777 A1 | 3/2010 | Paretti et al. |
| 2010/0082420 A1 | 4/2010 | Trifiletti et al. |
| 2010/0174596 A1 | 7/2010 | Gilman et al. |
| 2010/0223145 A1 | 9/2010 | Dragt |
| 2010/0269059 A1 | 10/2010 | Othmer et al. |
| 2011/0047013 A1 | 2/2011 | McKenzie, III |
| 2011/0055084 A1 | 3/2011 | Singh |
| 2011/0071892 A1 | 3/2011 | Dickelman |
| 2011/0087550 A1 | 4/2011 | Fordyce, III et al. |
| 2011/0145052 A1 | 6/2011 | Lin et al. |
| 2011/0178883 A1 | 7/2011 | Granbery et al. |
| 2011/0180598 A1 | 7/2011 | Morgan et al. |
| 2011/0251892 A1 | 10/2011 | Laracey |
| 2011/0258014 A1 | 10/2011 | Evangelist et al. |
| 2011/0258689 A1 | 10/2011 | Cohen et al. |
| 2011/0302019 A1 | 12/2011 | Proctor, Jr. et al. |
| 2011/0302080 A1 | 12/2011 | White et al. |
| 2011/0313867 A9 | 12/2011 | Silver |
| 2011/0320345 A1 | 12/2011 | Taveau et al. |
| 2012/0011072 A1 | 1/2012 | Lodolo |
| 2012/0016731 A1 | 1/2012 | Smith et al. |
| 2012/0029990 A1 | 2/2012 | Fisher |
| 2012/0030044 A1 | 2/2012 | Hurst |
| 2012/0059701 A1 | 3/2012 | van der Veen et al. |
| 2012/0059758 A1 | 3/2012 | Carlson |
| 2012/0084210 A1 | 4/2012 | Farahmand |
| 2012/0089418 A1 | 4/2012 | Kamath et al. |
| 2012/0095867 A1 | 4/2012 | McKelvey |
| 2012/0095871 A1 | 4/2012 | Dorsey et al. |
| 2012/0110568 A1 | 5/2012 | Abel et al. |
| 2012/0150611 A1 | 6/2012 | Isaacson et al. |
| 2012/0150742 A1 | 6/2012 | Poon et al. |
| 2012/0185306 A1 | 7/2012 | Cheng |
| 2012/0209773 A1 | 8/2012 | Ranganathan |
| 2012/0244885 A1 | 9/2012 | Hefetz |
| 2012/0254031 A1 | 10/2012 | Walker et al. |
| 2012/0271725 A1 | 10/2012 | Cheng |
| 2012/0278727 A1 | 11/2012 | Ananthakrishnan et al. |
| 2012/0284036 A1 | 11/2012 | Evans |
| 2012/0290422 A1 | 11/2012 | Bhinder |
| 2012/0290609 A1 | 11/2012 | Britt |
| 2012/0296679 A1 | 11/2012 | Im |
| 2012/0323685 A1 | 12/2012 | Ullah |
| 2013/0006773 A1 | 1/2013 | Lutnick et al. |
| 2013/0024341 A1 | 1/2013 | Jeon et al. |
| 2013/0030889 A1 | 1/2013 | Davich et al. |
| 2013/0048719 A1 | 2/2013 | Bennett |
| 2013/0050080 A1 | 2/2013 | Dahl et al. |
| 2013/0054320 A1 | 2/2013 | Dorso et al. |
| 2013/0065672 A1 | 3/2013 | Gelman et al. |
| 2013/0066783 A1 | 3/2013 | Wolff |
| 2013/0073363 A1 | 3/2013 | Boal |
| 2013/0103574 A1 | 4/2013 | Conrad et al. |
| 2013/0103946 A1 | 4/2013 | Binenstock |
| 2013/0117329 A1 | 5/2013 | Bank et al. |
| 2013/0124333 A1 | 5/2013 | Doughty et al. |
| 2013/0132140 A1 | 5/2013 | Amin et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0151613 A1 | 6/2013 | Dhawan et al. |
| 2013/0159172 A1 | 6/2013 | Kim |
| 2013/0159446 A1 | 6/2013 | Carlson et al. |
| 2013/0166402 A1 | 6/2013 | Parento et al. |
| 2013/0179227 A1 | 7/2013 | Booth et al. |
| 2013/0198018 A1 | 8/2013 | Baig |
| 2013/0204727 A1 | 8/2013 | Rothschild |
| 2013/0218721 A1 | 8/2013 | Borhan et al. |
| 2013/0225081 A1 | 8/2013 | Doss et al. |
| 2013/0236109 A1 | 9/2013 | Madden et al. |
| 2013/0246207 A1 | 9/2013 | Novak et al. |
| 2013/0246280 A1 | 9/2013 | Kirsch |
| 2013/0246301 A1 | 9/2013 | Radhakrishnan et al. |
| 2013/0268431 A1 | 10/2013 | Mohsenzadeh |
| 2013/0290173 A1 | 10/2013 | Nemeroff |
| 2013/0290522 A1 | 10/2013 | Behm, Jr. |
| 2013/0291018 A1 | 10/2013 | Billings et al. |
| 2013/0297933 A1 | 11/2013 | Fiducia et al. |
| 2013/0317835 A1 | 11/2013 | Mathew |
| 2013/0317950 A1 | 11/2013 | Abraham et al. |
| 2013/0332385 A1 | 12/2013 | Kilroy et al. |
| 2013/0346223 A1 | 12/2013 | Prabhu et al. |
| 2014/0006190 A1* | 1/2014 | Loomis, III .......... G06Q 20/20 705/18 |
| 2014/0012754 A1 | 1/2014 | Hanson et al. |
| 2014/0019236 A1 | 1/2014 | Argue et al. |
| 2014/0025446 A1 | 1/2014 | Nagarajan et al. |
| 2014/0052633 A1 | 2/2014 | Gandhi |
| 2014/0057667 A1 | 2/2014 | Blankenship et al. |

(56) References Cited

U.S. PATENT DOCUMENTS

| | | |
|---|---|---|
| 2014/0058861 A1 | 2/2014 | Argue et al. |
| 2014/0081853 A1 | 3/2014 | Sanchez et al. |
| 2014/0081854 A1 | 3/2014 | Sanchez et al. |
| 2014/0096179 A1 | 4/2014 | Ben-Shalom et al. |
| 2014/0099888 A1 | 4/2014 | Flanagan et al. |
| 2014/0108245 A1 | 4/2014 | Drummond et al. |
| 2014/0114781 A1 | 4/2014 | Watanabe |
| 2014/0122345 A1 | 5/2014 | Argue et al. |
| 2014/0129135 A1 | 5/2014 | Holden et al. |
| 2014/0129302 A1 | 5/2014 | Amin et al. |
| 2014/0129357 A1 | 5/2014 | Goodwin |
| 2014/0129951 A1 | 5/2014 | Amin et al. |
| 2014/0136318 A1 | 5/2014 | Alberth, Jr. et al. |
| 2014/0156508 A1 | 6/2014 | Argue et al. |
| 2014/0180805 A1 | 6/2014 | Argue et al. |
| 2014/0184505 A1 | 7/2014 | Fullerton et al. |
| 2014/0207669 A1 | 7/2014 | Rosenberg |
| 2014/0236762 A1 | 8/2014 | Gerber et al. |
| 2014/0249947 A1 | 9/2014 | Hicks et al. |
| 2014/0254820 A1 | 9/2014 | Gardenfors et al. |
| 2014/0257958 A1 | 9/2014 | Andrews |
| 2014/0278589 A1 | 9/2014 | Rados et al. |
| 2014/0279184 A1 | 9/2014 | Lai et al. |
| 2014/0379497 A1 | 12/2014 | Varma et al. |
| 2014/0379536 A1 | 12/2014 | Varma et al. |
| 2014/0379580 A1 | 12/2014 | Varma et al. |
| 2015/0025983 A1 | 1/2015 | Cicerchi |
| 2015/0112838 A1 | 4/2015 | Li et al. |
| 2015/0134439 A1 | 5/2015 | Maxwell et al. |
| 2015/0187021 A1 | 7/2015 | Moring et al. |
| 2015/0294312 A1 | 10/2015 | Kendrick et al. |
| 2015/0332223 A1 | 11/2015 | Aaron et al. |

FOREIGN PATENT DOCUMENTS

| | | |
|---|---|---|
| CA | 2 916 603 A1 | 12/2014 |
| CA | 2 930 186 A1 | 5/2015 |
| GB | 2530451 A | 3/2016 |
| KR | 10-2006-0103089 A | 9/2006 |
| WO | 2014/210020 A1 | 12/2014 |
| WO | 2015/069389 A1 | 5/2015 |
| WO | 2015/100378 A1 | 7/2015 |
| WO | 2015/179316 A1 | 11/2015 |
| WO | 2018/049185 A1 | 3/2018 |

OTHER PUBLICATIONS

Notice of Allowance dated Nov. 24, 2017, for U.S. Appl. No. 13/829,658, of Morgan, T.B., et al., filed Mar. 14, 2013.
Non-Final Office Action dated Dec. 13, 2017, for U.S. Appl. No. 14/312,397, of Varma, A.K., et al., filed Jun. 23, 2014.
Munson, J., and Gupta, V.K., "Location-Based Notification as a General-Purpose Service," dated Sep. 28, 2002, Retrieved from the Internet URL-https://ai2-s2-pdfs.s3.amazonaws.com/1bb5/6ae0a70b030e2f2376ed246834bddcabd27b.pdf, pp. 40-44.
Non-Final Office Action dated Jul. 14, 2016, for U.S. Appl. No. 14/160,490, of Moring, D., et al., filed Jan. 21, 2014.
Non-Final Office Action dated Jul. 21, 2016, for U.S. Appl. No. 14/329,638, of Aaron, P., et al., filed Jul. 11, 2014.
Non-Final Office Action dated Aug. 10, 2016, for U.S. Appl. No. 14/312,433, of Varma, A.K., et al., filed Jun. 23, 2014.
Final Office Action dated Sep. 1, 2016, for U.S. Appl. No. 14/062,617, of Templeton, T., et al., filed Oct. 24, 2013.
Non-Final Office Action dated Sep. 8, 2016, for U.S. Appl. No. 14/312,371, of Varma, A.K., et al., filed Jun. 23, 2014.
Notice of Allowance dated Sep. 13, 2016, for U.S. Appl. No. 14/692,655, of Borovsky, A., et al., filed Apr. 21, 2015.
Advisory Action dated Sep. 21, 2016, for U.S. Appl. No. 13/829,658, of Morgan, T.B., et al., filed Mar. 14, 2013.
Non-Final Office Action dated Sep. 22, 2016, for U.S. Appl. No. 14/182,655, of Spindel, N., et al., filed Feb. 18, 2014.
Examination Report No. 1 for Australian Patent Application No. 2014302661, dated Sep. 27, 2016.
Advisory Action dated Sep. 29, 2016, for U.S. Appl. No. 14/329,658, of Aaron, P., et al., filed Jul. 11, 2014.
Final Office Action dated Oct. 11, 2016, for U.S. Appl. No. 13/829,080, of Morgan, T.B., et al., filed Mar. 14, 2013.
Final Office Action dated Nov. 1, 2016, for U.S. Appl. No. 14/160,490, of Moring, D., et al., filed Jan. 21, 2014.
Final Office Action dated Nov. 10, 2016, for U.S. Appl. No. 13/830,350, of Morgan, T.B., et al., filed Mar. 14, 2013.
Non-Final Office Action dated Nov. 17, 2016, for U.S. Appl. No. 14/701,571, of Jen, M., et al., filed May 1, 2015.
Advisory Action dated Nov. 28, 2016, for U.S. Appl. No. 14/062,617, of Templeton, T., et al., filed Oct. 24, 2013.
Final Office Action dated Nov. 28, 2016, for U.S. Appl. No. 14/312,397, of Varma, A.K., et al., filed Jun. 23, 2014.
Final Office Action dated Nov. 29, 2016, for U.S. Appl. No. 14/088,113, of Maxwell, D.W., et al., filed Nov. 22, 2013.
Final Office Action dated Dec. 12, 2016, for U.S. Appl. No. 14/088,141, of Maxwell, D.W., et al., filed Nov. 22, 2013.
Examination Report No. 1 for Australian Patent Application No. 2014347192, dated Dec. 15, 2016.
Notice of Allowance dated Jan. 13, 2017, for U.S. Appl. No. 14/329,658, of Aaron, P., et al., filed Jul. 11, 2014.
Final Office Action dated Jan. 27, 2017, for U.S. Appl. No. 14/329,638, of Aaron, P., et al., filed Jul. 11, 2014.
Examiner's Requisition for Canadian Patent Application No. 2,930,186, dated Jan. 30, 2017.
Examiner's Requisition for Canadian Patent Application No. 2,916,603, dated Feb. 9, 2017.
Notice of Acceptance for Australian Patent Application No. 2014347192, dated Feb. 16, 2017.
Corrected Notice of Allowance dated Feb. 27, 2017, for U.S. Appl. No. 14/329,658, of Aaron, P., et al., filed Jul. 11, 2014.
Notice of Allowance dated Mar. 2, 2017, for U.S. Appl. No. 13/829,080, of Morgan, T.B., et al., filed Mar. 14, 2013.
Non-Final Office Action dated Mar. 15, 2017, for U.S. Appl. No. 13/829,658, of Morgan, T.B., et al., filed Mar. 14, 2013.
Notice of Allowance dated Mar. 23, 2017, for U.S. Appl. No. 14/701,571, of Jen, M., et al., filed May 1, 2015.
Advisory Action dated Apr. 10, 2017, for U.S. Appl. No. 14/312,397, of Varma, A.K., et al., filed Jun. 23, 2014.
Non-Final Office Action dated Apr. 18, 2017, for U.S. Appl. No. 14/160,490, of Moring, D., et al., filed Jan. 21, 2014.
Final Office Action dated Apr. 19, 2017, for U.S. Appl. No. 14/312,433, of Varma, A.K., et al., filed Jun. 23, 2014.
Final Office Action dated Apr. 27, 2017, for U.S. Appl. No. 14/312,371, of Varma, A.K., et al., filed Jun. 23, 2014.
Non-Final Office Action dated Jun. 19, 2017, for U.S. Appl. No. 14/730,860, of Sasmaz, Y., et al., filed Jun. 4, 2015.
Advisory Action dated Jun. 30, 2017, for U.S. Appl. No. 14/312,433, of Varma, A.K., et al., filed Jun. 23, 2014.
Non-Final Office Action dated Jul. 10, 2017, for U.S. Appl. No. 13/830,350, of Morgan, T.B., et al., filed Mar. 14, 2013.
Advisory Action dated Jul. 11, 2017, for U.S. Appl. No. 14/312,371, of Varma, A.K., et al., filed Jun. 23, 2014.
Examination Report No. 1 for Australian Patent Application No. 2015264426, dated Jul. 11, 2017.
International Search Report and Written Opinion for International Application No. PCT/US2014/043891, dated Dec. 10, 2014.
International Search Report and Written Opinion for International Application No. PCT/US2014/058398, dated Dec. 24, 2014.
International Search Report and Written Opinion for International Application No. PCT/US2014/072269, dated Mar. 31, 2015.
International Search Report and Written Opinion for International Application No. PCT/US2015/031423, dated Aug. 13, 2015.
International Search Report and Written Opinion for International Application No. PCT/US2017/050719, dated Nov. 28, 2017.
Non-Final Office Action dated Dec. 29, 2017, for U.S. Appl. No. 14/165,256, of Aaron, P., filed Jan. 27, 2014.
Examiner's Requisition for Canadian Patent Application No. 2,930,186, dated Jan. 11, 2018.

(56) References Cited

OTHER PUBLICATIONS

Final Office Action dated Jan. 22, 2018, for U.S. Appl. No. 13/830,350, of Morgan, T.B., et al., filed Mar. 14, 2013.
Examiner's Requisition for Canadian Patent Application No. 2,916,603, dated Feb. 15, 2018.
Final Office Action dated Aug. 10, 2017, for U.S. Appl. No. 14/160,490, of Moring, D., et al., filed Jan. 21, 2014.
Final Office Action dated Sep. 15, 2017, for U.S. Appl. No. 14/182,655, of Spindel, N., et al., filed Feb. 18, 2014.
Examination Report No. 2 for Australian Patent Application No. 2014302661, dated Sep. 26, 2017.
Advisory Action dated Oct. 31, 2017, for U.S. Appl. No. 14/160,490, of Moring, D., et al., filed Jan. 21, 2014.
Non-Final Office Action dated Jul. 17, 2019, for U.S. Appl. No. 15/685,897, of Woodyard, C., et al., filed Aug. 24, 2017.
Notice of Allowance dated Oct. 30, 2019, for U.S. Appl. No. 15/685,897, of Woodyard, C., et al., filed Aug. 24, 2017.
"Another eBay Band-Aid Fails to Fix the New Pricing Structure Flaws," posted on Oct. 18, 2008, Retrieved from the Internet URL: https://thebrewsnews.wordpress.com/2008/10/18/another-ebay-band-aid-fails-to-fix-the-new-pricing-structure-flaws/, pp. 1-4.
"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.
"Merchantindustry.com-Best Merchant Services," Retrieved from Internet URL: https://web.archive.org/web/20121020212419/http://www.merchantindustry.com/, on Dec. 30, 2015, pp. 1-7.
"Online Shopping," dated Nov. 2, 2014, Retrieved from the Internet URL: http://en.wikipedia.org/wiki/Online_shopping, on Nov. 10, 2014, pp. 1-12.
"Payment Gateway," Wikipedia, published May 30, 2014, Retrieved from the Internet URL: http://en.wikipedia.org/wiki/Payment gateways, on Jun. 6, 2014, pp. 1-3.
"ProPay JAK Mobile Card Reader," Propay, published Dec. 27, 2011, Retrieved from the Internet URL: https://web.archive.org/web/20111227055421/https://www.propay.com/products-services/accept-payments/jak-card-reader, pp. 1-2.
"Tracking Inventory," PayPal, dated Jan. 4, 2010, Retrieved from the Internet URL: https://www.paypal-community.com/t5/How-to-use-PayPal-Archive/Tracking-inventory/td-p/19392, pp. 1-3.
"Verified by Visa Acquirer and Merchant Implementation Guide," U.S. Region, Visa Public, May 2011, pp. 1-114.
"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.
Punch, L., "E-commerce: Just what does card-present mean these days," dated Oct. 1, 2012, Retrieved from the Internet URL: http://digitaltransactions.net/news/story/E-Commerce_-Just-What-Does-Card-Present-Mean-These-Days, on Feb. 17, 2015, pp. 1-4.
Shalmanese, "The Straight Dope Message Board," message dated Oct. 5, 2013, Retrieved from the Internet URL: http://boards.straightdope.com/sdmb/showthread.php?t=703989%BB, on Jul. 18, 2016, pp. 1-10.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
Non-Final Office Action dated Apr. 10, 2014, for U.S. Appl. No. 14/160,490, of Moring, D., et al., filed Jan. 21, 2014.
Non-Final Office Action dated May 29, 2014, for U.S. Appl. No. 13/837,562, of Chin, H.C.A., et al., filed Mar. 15, 2013.
Non-Final Office Action dated Aug. 27, 2014, for U.S. Appl. No. 14/165,256, of Aaron, P., filed Jan. 27, 2014.
Final Office Action dated Aug. 28, 2014, for U.S. Appl. No. 14/160,490, of Moring, D., et al., filed Jan. 21, 2014.
Advisory Action dated Nov. 18, 2014, for U.S. Appl. No. 14/160,490, of Moring, D., et al., filed Jan. 21, 2014.
Non-Final Office Action dated Dec. 1, 2014, for U.S. Appl. No. 14/062,617, of Templeton, T., et al., filed Oct. 24, 2013.
Non Final Office Action dated Dec. 15, 2014, for U.S. Appl. No. 14/312,397, of Varma, A.K., et al., filed Jun. 23, 2014.
Final Office Action dated Jan. 26, 2015, for U.S. Appl. No. 13/837,562, of Chin, H.C.A., et al., filed Mar. 15, 2013.
Notice of Allowance dated Feb. 20, 2015, for U.S. Appl. No. 14/513,076, of Borovsky, A., et al., filed Oct. 13, 2014.
Final Office Action dated Mar. 17, 2015, for U.S. Appl. No. 14/165,256, of Aaron, P., filed Jan. 27, 2014.
Non-Final Office Action dated Mar. 19, 2015, for U.S. Appl. No. 14/329,638, of Aaron, P., et al., filed Jul. 11, 2014.
Final Office Action dated Apr. 16, 2015, for U.S. Appl. No. 14/062,617, of Templeton, T., et al., filed Oct. 24, 2013.
Non-Final Office Action dated May 20, 2015, for U.S. Appl. No. 13/829,080, of Morgan, T.B., et al., filed Mar. 14, 2013.
Non-Final Office Action dated Jun. 11, 2015, for U.S. Appl. No. 14/692,655, of Borovsky, A., et al., filed Apr. 21, 2015.
Final Office Action dated Aug. 31, 2015, for U.S. Appl. No. 14/312,397, of Varma, A.K., et al., filed Jun. 23, 2014.
Final Office Action dated Sep. 17, 2015, for U.S. Appl. No. 13/829,080, of Morgan, T.B., et al., filed Mar. 14, 2013.
Non-Final Office Action dated Oct. 5, 2015, for U.S. Appl. No. 13/829,658, of Morgan, T.B., et al., filed Mar. 14, 2013.
Non-Final Office Action dated Oct. 6, 2015, for U.S. Appl. No. 14/329,658, of Aaron, P., et al. filed Jul. 11, 2014.
Non-Final Office Action dated Oct. 8, 2015, for U.S. Appl. No. 14/165,256, of Aaron, P., filed Jan. 27, 2014.
Final Office Action dated Oct. 16, 2015, for U.S. Appl. No. 14/692,655, of Borovsky, A., et al., filed Apr. 21, 2015.
Final Office Action dated Oct. 21, 2015, for U.S. Appl. No. 14/329,638, of Aaron, P., et al. filed Jul. 11, 2014.
Non-Final Office Action dated Nov. 18, 2015, for U.S. Appl. No. 14/182,655, of Spindel, N., et al., filed Feb. 18, 2014.
Advisory Action dated Nov. 24, 2015, for U.S. Appl. No. 13/829,080, of Morgan, T.B., et al., filed Mar. 14, 2013.
Advisory Action dated Dec. 30, 2015, for U.S. Appl. No. 14/692,655, of Borovsky, A., el al., filed Apr. 21, 2015.
Non-Final Office Action dated Jan. 14, 2016, for U.S. Appl. No. 14/312,397, of Varma, A.K., et al., filed Jun. 23, 2014.
Non-Final Office Action dated Feb. 2, 2016, for U.S. Appl. No. 13/829,080, of Morgan, T.B., et al., filed Mar. 14, 2013.
Non-Final Office Action dated Feb. 23, 2016, for U.S. Appl. No. 14/062,617, of Templeton, T., et al., filed Oct. 24, 2013.
Non-Final Office Action dated Mar. 14, 2016, for U.S. Appl. No. 14/692,655, of Borovsky, A., et al., filed Apr. 21, 2015.
Final Office Action dated Apr. 13, 2016, for U.S. Appl. No. 14/165,256, of Aaron, P., filed Jan. 27, 2014.
Final Office Action dated Apr. 27, 2016, for U.S. Appl. No. 14/182,655, of Spindel, N., et al., filed Feb. 18, 2014.
Non-Final Office Action dated May 3, 2016, for U.S. Appl. No. 13/830,350, of Morgan, T.B., et al., filed Mar. 14, 2013.
Non-Final Office Action dated May 5, 2016, for U.S. Appl. No. 14/312,397, of Varma, A.K., et al., filed Jun. 23, 2014.
Final Office Action dated May 20, 2016, for U.S. Appl. No. 14/329,658, of Aaron, P., et al., filed Jul. 11, 2014.
Non-Final Office Action dated Jun. 7, 2016, for U.S. Appl. No. 14/088,113, of Maxwell, D.W., et al., filed Nov. 22, 2013.
Non-Final Office Action dated Jun. 8, 2016, for U.S. Appl. No. 14/088,141, of Maxwell, D.W., et al., filed Nov. 22, 2013.
Final Office Action dated Jun. 20, 2016, for U.S. Appl. No. 13/829,658, of Morgan, T.B., et al., filed Mar. 14, 2013.

\* cited by examiner

300

```
┌─────────────────────────────────────────────────────────────┐
│ AUTHORIZE A PAYMENT INSTRUMENT WITH RESPECT TO A COST OF A  │
│ TRANSACTION IN WHICH A HOLDER OF THE PAYMENT INSTRUMENT     │
│ PURCHASES MULTIPLE ITEMS FROM A MERCHANT                    │
│ 302                                                         │
└─────────────────────────────────────────────────────────────┘
                              │
                              ▼
┌─────────────────────────────────────────────────────────────┐
│ GENERATE A PURCHASE TICKET ASSOCIATED WITH THE MULTIPLE     │
│ ITEMS OF THE TRANSACTION                                    │
│ 304                                                         │
└─────────────────────────────────────────────────────────────┘
                              │
                              ▼
┌─────────────────────────────────────────────────────────────┐
│ CAPTURE, DURING A FIRST TIME PERIOD, PAYMENT FOR A FIRST    │
│ PORTION OF THE COST OF THE TRANSACTION, THE FIRST PORTION   │
│ CORRESPONDING TO A COST OF A FIRST ITEM OF THE MULTIPLE     │
│ ITEMS                                                       │
│ 306                                                         │
└─────────────────────────────────────────────────────────────┘
                              │
                              ▼
┌─────────────────────────────────────────────────────────────┐
│ RECEIVE, DURING A SECOND TIME PERIOD AFTER THE FIRST TIME   │
│ PERIOD, A REQUEST TO CAPTURE PAYMENT FOR A SECOND PORTION   │
│ OF THE COST OF THE TRANSACTION, THE SECOND PORTION          │
│ CORRESPONDING TO A COST OF A SECOND ITEM OF THE MULTIPLE    │
│ ITEMS                                                       │
│ 308                                                         │
└─────────────────────────────────────────────────────────────┘
                              │
                              ▼
┌─────────────────────────────────────────────────────────────┐
│ DETERMINE, BASED AT LEAST IN PART ON THE PURCHASE TICKET,   │
│ THAT THE PAYMENT INSTRUMENT HAS ALREADY BEEN AUTHORIZED     │
│ WITH RESPECT TO THE COST OF THE SECOND ITEM                 │
│ 310                                                         │
└─────────────────────────────────────────────────────────────┘
                              │
                              ▼
┌─────────────────────────────────────────────────────────────┐
│ CAPTURE PAYMENT FOR THE SECOND PORTION OF THE COST OF THE   │
│ TRANSACTION                                                 │
│ 312                                                         │
└─────────────────────────────────────────────────────────────┘
```

FIG. 3

INTELLIGENT CAPTURE IN MIXED FULFILLMENT TRANSACTIONS

RELATED APPLICATIONS

This application claims priority to and is a continuation of U.S. patent application Ser. No. 14/701,571, filed on May 1, 2015, now known as U.S. Pat. No. 9,721,251, issued on Aug. 1, 2017, the entire contents of which are incorporated herein by reference.

BACKGROUND

Brick-and-mortar (i.e., physical) stores may be stocked with a finite inventory of items at a given time. When a consumer visits a brick-and-mortar store, the consumer may acquire one or more items at the store, but find that a particular desired item is unavailable. In such cases, the consumer may order the desired item from an online store for delivery, for example, and/or arrange to pick up the desired item at a different brick-and-mortar store. However, when items are acquired via different fulfillment modes, the consumer may effectively be required to conduct multiple transactions, and tender a payment instrument for authorization with respect to each transaction. This can be cumbersome for both consumers and merchants.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 is a flow diagram illustrating an example process for generating a purchase ticket and intelligently capturing payment according to some implementations.

DETAILED DESCRIPTION

Figure 1:
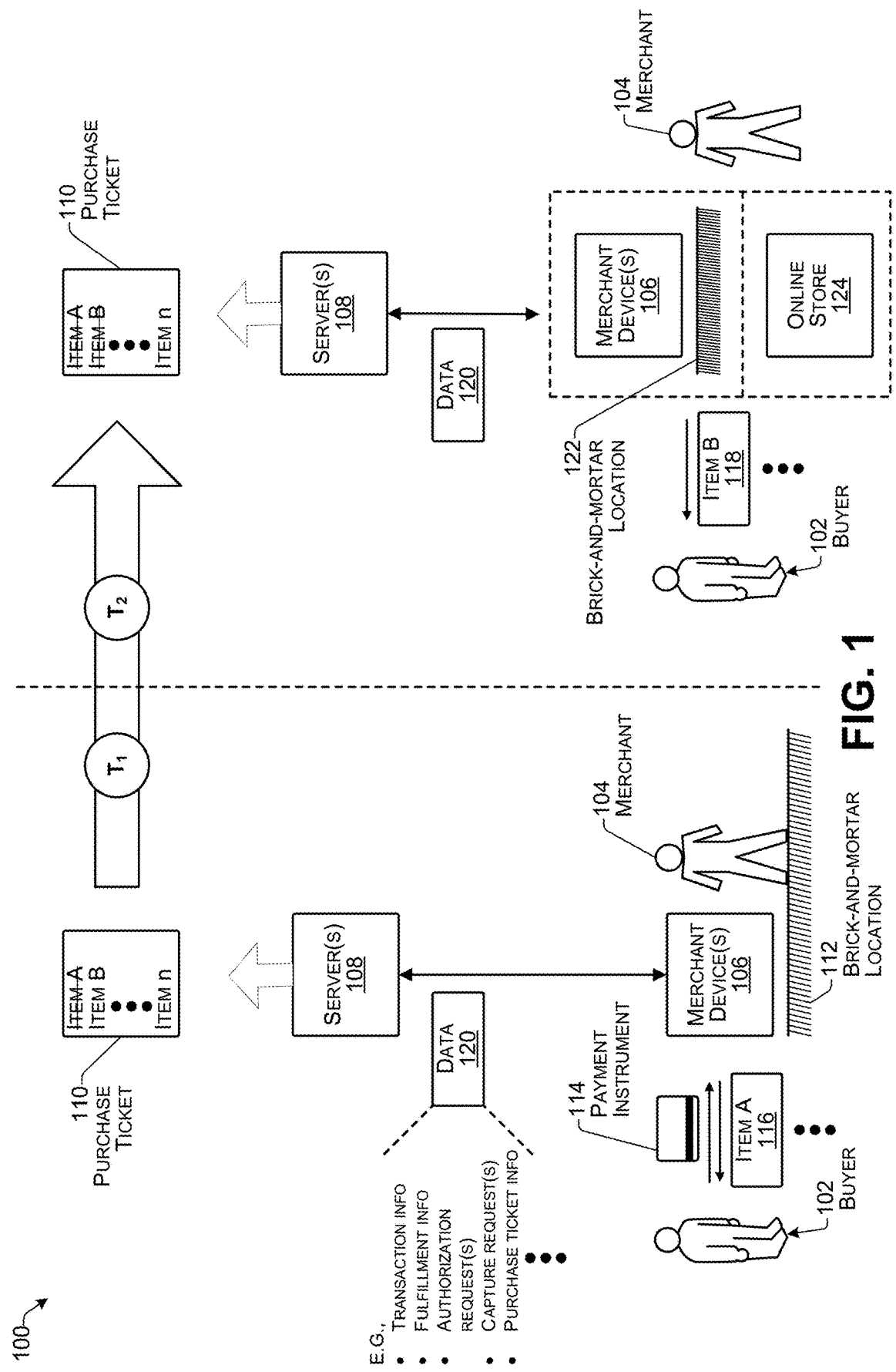
FIG. 1 is a schematic diagram illustrating an example scenario in which a buyer and a merchant engage in a mixed fulfillment transaction. The example scenario includes one or more merchant devices interacting with one or more servers to generate a purchase ticket utilized in intelligent capture techniques according to some implementations.

This disclosure describes, in part, techniques for intelligent payment capture in mixed fulfillment transactions. In various implementations, the techniques described herein may include generating a purchase ticket associated with multiple items in a mixed fulfillment transaction. One or more items of the multiple items in the mixed fulfillment transaction may be fulfilled via a different fulfillment mode than one or more other items of the multiple items in the mixed fulfillment transaction. Additionally or alternatively, one or more of the items of the multiple items in the mixed fulfillment transaction may be fulfilled during a different time period than one or more other items of the multiple items in the mixed fulfillment transaction.

For example, a buyer may visit a first brick-and-mortar location of a merchant during a first time period. The buyer may select one or multiple items that are available at the first brick-and-mortar location for purchase. In some cases, the buyer may also desire to purchase one or multiple items that are unavailable at the brick-and-mortar location during the first time period. The buyer and/or the merchant may determine whether the merchant is capable of fulfilling the desired items through one or more other channels (e.g., a different brick-and-mortar location, an online store, etc.). The buyer and the merchant may conduct a transaction for the items that are available at the brick-and-mortar location and the desired items that are unavailable at the brick-and-mortar location but are capable of being fulfilled through one or more other channels.

The buyer may tender a payment instrument (e.g., a debit card, a credit card, a stored-value or gift card, etc.) to satisfy the cost of the multiple items in the mixed fulfillment transaction. In some cases, the merchant may operate a merchant device, such as a point-of-sale (POS) device to process the payment instrument. For instance, the merchant device may be in communication with one or more payment service computing devices associated with a payment service. The merchant device may send a request to the payment service computing devices to authorize the payment instrument for the cost of the multiple items in the mixed fulfillment transaction.

In various implementations, the payment service computing devices may authorize the payment instrument and generate a purchase ticket associated with the multiple items in the mixed fulfillment transaction.

In some cases, the merchant device may send, to the payment service computing devices, a first request to capture payment for a first item (of the multiple items in the mixed fulfillment transaction) that is available at the first brick-and-mortar location during the first time period. Additionally or alternatively, the merchant device may send, to the payment service computing devices, an indication that the first item has been fulfilled at the first brick-and-mortar location of the merchant.

The payment service computing devices may capture payment for the first item at least partly in response to receiving the first request to capture payment for the first item and/or receiving the indication the first item has been fulfilled at the first brick-and-mortar location of the merchant. The payment service computing devices, however, may determine not to capture payment for a second item during the first time period, if the second item is unavailable at the first brick-and-mortar location and therefore is not being fulfilled during the first time period. Accordingly, the capture of payment the first item may be considered a partial capture with respect to the total amount that the purchase ticket indicates is authorized on the payment instrument for the mixed fulfillment transaction.

The payment service computing devices may update the purchase ticket. For instance, the payment service computing devices may update the purchase ticket to indicate that payment has been captured for the first item. As another example, the payment service computing devices may update the purchase ticket to indicate a remaining authorized amount on the payment instrument for the mixed fulfillment transaction.

During a second time period (e.g., after the first time period), the buyer may obtain possession of the second item (the item that was unavailable at the first brick-and-mortar location of the merchant) That is, the second item may be fulfilled during the second time period. The second item may be fulfilled via a different fulfillment mode than that used to fulfill the first item. For example, the buyer may pick up the second item at a different brick-and-mortar location of the merchant. As another example, an online store of the merchant may ship the second item to the buyer. In some cases, the buyer may return to the first brick-and-mortar location during the second time period to pick up the second item (e.g., if the second item is made available at the first brick-and-mortar location).

The payment service computing devices may receive (e.g., from the merchant device and/or from one or more computing devices associated with an online store), during the second time period, a second request to capture payment for the second item. Additionally or alternatively, payment service computing devices may receive an indication that the second item has been fulfilled, i.e., the payment service computing devices may receive an indication that the buyer has received the second item (e.g., from the second brick-and-mortar location of the merchant and/or from the online store of the merchant) The payment service computing devices may capture payment for the second item at least partly in response to receiving the second request to capture payment and/or receiving the indication that the second item has been fulfilled.

In various implementations, the merchant device may send the second request to capture payment for the second item without the buyer having to tender the payment instrument for authorization. Rather, the merchant device may be aware of the purchase ticket and thus know that the payment instrument has already been authorized for the cost of the mixed fulfillment transaction, which includes the cost of the second item. Accordingly, a single authorization of a payment instrument can be conducted to generate a purchase ticket for items in a single, mixed fulfillment transaction. The purchase ticket may therefore be utilized in the intelligent payment capture techniques described herein to facilitate more efficient, flexible, and convenient transactions between buyers and merchants.

As used herein, a merchant may include any business engaged in the offering of goods or services for acquisition by buyers. Actions attributed to a merchant may include actions performed by owners, employees, or other agents of the merchant, and thus no distinction is made herein unless specifically discussed. In addition, as used herein, a buyer may include any entity that acquires goods or services from a merchant, such as by purchasing, renting, leasing, borrowing, licensing, or the like. Hereinafter, goods and/or services offered by merchants may be referred to as items. Thus, a merchant and a buyer may interact with each other to conduct a transaction in which the buyer acquires an item from a merchant, and in return, the buyer provides payment to the merchant.

As used herein, a transaction may include a financial transaction for the acquisition of goods and/or services that is conducted between a buyer and a merchant. For example, when paying for a transaction, the buyer can provide the amount that is due to the merchant using cash or other payment instrument (e.g., a debit card, a credit card, a stored-value or gift card, a check, through an electronic payment application on a device carried by the customer, or the like). The merchant can interact with a merchant device, such as a point-of-sale (POS) device, to process the transactions, such as by inputting (e.g., manually, via a magnetic card reader or an RFID reader, etc.) identifiers associated with the payment instruments. For example, a payment instrument of the buyer may include one or more magnetic strips for providing card and customer information when swiped in a card reader. In other examples, other types of payment cards may be used, such as smart cards having a built-in memory chip that is read by the merchant device when the card is "dipped" into the reader, a radiofrequency identification tag, or so forth.

During the transaction, the merchant device can determine transaction information describing the transaction, such as the identifier of the payment instrument, an amount of payment received from the customer, the item(s) acquired by the customer, a time, place and date of the transaction, a card network associated with the payment instrument, an issuing bank of the payment instrument, and so forth. The merchant device can send the transaction information to a payment service over a network, either substantially contemporaneously with the conducting of the transaction when the merchant device is in an online mode, or later when the merchant device is in an online mode.

Generally, when a buyer and a merchant enter into an electronic payment transaction, the transaction is processed by electronically transferring funds from a financial account associated with the buyer to a financial account associated with the merchant. As such, the payment service may communicate with one or more computing devices of a card network (or "card payment network"), e.g., MasterCard®, VISA®, over a network to conduct financial transactions electronically. The payment service can also communicate with one or more computing devices of one or more banks, processing/acquiring services, or the like over a network. For example, the payment service may communicate with an acquiring bank, and/or an issuing bank, and/or a bank maintaining buyer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the buyer may use a debit card instead of a credit card, in which case, the bank computing device(s) of a bank corresponding to the debit card may receive communications regarding a transaction in which the buyer is participating. Additionally, there may be computing devices of other financial institutions involved in some types of transactions or in alternative system architectures, and thus, the foregoing are merely several examples for discussion purposes.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

FIG. 1 is a schematic diagram illustrating an example scenario 100 in which a buyer 102 and a merchant 104 engage in a mixed fulfillment transaction. The example scenario 100 includes one or more merchant devices 106 interacting with one or more servers 108 to generate a purchase ticket 110 utilized in intelligent capture techniques described herein.

During a first time period $T_1$, the buyer 102 may visit a first brick-and-mortar location 112 of the merchant 104. The buyer 102 may select (e.g., for purchase) one or multiple items that are available at the brick-and-mortar location 112. In some cases, the buyer 102 may also desire to purchase one or multiple items that are unavailable at the brick-and-mortar location 112 during the first time period $T_1$. The buyer 102 may indicate the desired items to the merchant 104. The buyer 102 and/or the merchant 104 may determine whether the merchant 104 is capable of fulfilling the desired items through one or more other channels (e.g., a different brick-and-mortar location, an online store, etc.). The buyer 102 and the merchant 104 may conduct a transaction for the items that are available at the brick-and-mortar location 112 and the desired items that are unavailable at the brick-and-mortar location 112 but are capable of being fulfilled through one or more other channels. That is, the desired items (unavailable at the brick-and-mortar location 112) may be processed together with the available items.

In various implementations, the buyer 102 may tender a payment instrument 114 (e.g., a debit card, a credit card, a stored-value or gift card, an electronic payment application on a device carried by the buyer 102, or the like) to satisfy the cost of multiple items (e.g., Item A 116, Item B 118, . . . Item n) in the transaction between the buyer 102 and the merchant 104. The merchant 104 can interact with a merchant device 106, such as a point-of-sale (POS) device, to process the transaction, such as by inputting (e.g., manually, via a magnetic card reader or an RFID reader, etc.) identifiers associated with the payment instrument 114. For example, a payment instrument 114 of the buyer may include one or more magnetic strips for providing card and buyer information when swiped in a card reader. In other examples, other types of payment cards may be used, such as smart cards having a built-in memory chip that is read by the merchant device when the card is "dipped" into the reader, a radiofrequency identification tag, or so forth.

During the transaction, the merchant device 106 can determine transaction information describing the transaction, such as the identifier of the payment instrument 114, an amount of payment received from the buyer 102, the items acquired by the buyer 102, a time, place and date of the transaction, a card network associated with the payment instrument 114, an issuing bank of the payment instrument 114, and so forth.

The merchant device 106 can send data 120 to the server 108 over a network. For instance, the merchant device 106 may send transaction information to the server 108, either substantially contemporaneously with the conducting of the transaction when the merchant device 106 is in an online mode, or later when the merchant device 106 is in an offline mode. In various implementations, the data 120 may include, but is not limited to, transaction information, fulfillment information, authorization requests, capture requests, and/or purchase ticket information.

In various implementations, the server 108 may receive the data 120, and utilize at least a portion of the data 120 to generate a purchase ticket 110 for a transaction. That is, the server 108 may generate the purchase ticket 110 based at least in part on data 120 received from the merchant device 106. The purchase ticket 110 may be associated with multiple items of the transaction. In some cases, the transaction may be a mixed fulfillment transaction. That is, one or more of the items of the transaction may be fulfilled at a later time and/or via a different fulfillment mode than one or more other items of the transaction.

For example, the buyer 102 may visit the brick-and-mortar location 112 of the merchant 104 during a first time period $T_1$. While browsing the items available at the brick-and-mortar location 112, the buyer 102 may find Item A 116 (e.g., a blue shirt). That is, Item A 116 may be available at the brick-and-mortar location 112 during the first time period $T_1$. The buyer 102 may indicate to the merchant 104 that the buyer 102 desires to purchase Item A 116. Furthermore, the buyer 102 may indicate to the merchant 104 that the buyer 102 desires to purchase Item B 118 (e.g., a red shirt). The buyer 102 and/or the merchant 104 may determine that, during the first time period $T_1$, Item B 118 is unavailable at the brick-and-mortar location 112. For instance, the buyer 102 may search the brick-and-mortar location 112 for Item B 118 and determine it is unavailable. Additionally or alternatively, the buyer 102 may inquire about Item B 118 to the merchant 104. The merchant 104 may conduct an inventory search (e.g., via the merchant device 106) and determine that Item B 118 is unavailable.

In some cases, the buyer 102 and/or the merchant 104 may determine that Item B 118 is available, for example, at a different brick-and-mortar location 122 of the merchant 104 and/or at an online store 124 of the merchant 104. For instance, the merchant 104 may use the merchant device 106 to conduct an inventory search across all distribution channels of the merchant 104.

The buyer 102 and the merchant 104 may conduct a transaction for multiple items, including Item A 116 and Item B 118. The buyer 102 may tender the payment instrument 114 to satisfy the cost of the multiple items of the transaction. The merchant device 106 may send, to the server 108, a request to authorize the payment instrument 114 for the cost of multiple items. In an illustrative example scenario, assume Item A 116 and Item B 118 are the only two items in the transaction. In this example, assume Item A 116 costs $20 and Item B 118 costs $30. The total cost for the transaction of Item A 116 and Item B 118 would amount to $50.

The merchant device 106 may send, to the server 108, a request to authorize the payment instrument 114 for $50. The server 108 may determine attempt to authorize the payment instrument 114 for the $50 total cost of the transaction. This authorizing may include communicating with computing devices of a card payment network (e.g., Mastercard®, Visa®, etc.) and/or an issuing back associated with the payment instrument 114 to determine whether the payment instrument 114 is authorized for the $50 total cost of the transaction.

The server 108 may generate the purchase ticket 110 in connection with the transaction. The purchase ticket 110 may be associated with the multiple items of the transaction. For example, the purchase ticket 110 may be associated with Item A 116 and Item B 118. The purchase ticket 110 may indicate an amount authorized on the payment instrument 114 for the cost of the transaction. The purchase ticket 114 may include any information associated with the multiple items and/or the transaction. As non-limiting examples, the purchase ticket 114 may include one or more of a total amount authorized on the payment instrument 114 for the total cost of the transaction, an amount authorized on the payment instrument 114 for an individual item of the multiple items, a fulfillment mode corresponding to an individual item of the multiple items, a fulfillment status corresponding to whether an individual item of the multiple items has been fulfilled, or a capture status corresponding to whether payment has been captured with respect to an individual item of the multiple items.

In some cases, the merchant device 106 may send, to the server 108, a first request to capture payment for Item A 116, the item available at the brick-and-mortar location 112 during the first time period $T_1$. Additionally or alternatively, the merchant device 106 may send, to the server 108, an indication that Item A 116 has been fulfilled at the brick-and-mortar location 112, i.e., the server 108 may receive an indication that the buyer 102 has received Item A 116 at the brick-and-mortar location 112. The server 108 may capture payment for Item A 116 at least partly in response to receiving the first request to capture payment for Item A 116 and/or receiving the indication that Item A 116 has been fulfilled at the brick-and-mortar location 112. The server 108, however, may determine not to capture payment for Item B 118 during the first time period $T_1$, as Item B 118 is unavailable at the brick-and-mortar location 112 and therefore is not being fulfilled during the first time period $T_1$. Accordingly, the capture of payment for Item A may be considered a partial capture with respect to the total amount that the purchase ticket 110 indicates is authorized on the payment instrument 114 for the transaction.

The server 108 may update the purchase ticket 110. For instance, the server 108 may update the purchase ticket 110 to indicate that payment has been captured for Item A 116. As another example, the server 108 may update the purchase ticket 110 to indicate a remaining authorized amount on the payment instrument 114 for the transaction. As illustrated in FIG. 1, the purchase ticket 110 (corresponding to the first time period $T_1$) shows a line through Item A 116 to indicate that payment has been captured for Item A. It should be understood, however, that the line through Item A is merely illustrative. The purchase ticket 110 may track and/or indicate payment capture in any other suitable manner.

During a second time period $T_2$ (e.g., after the first time period $T_1$), the buyer 102 may obtain possession of Item B 118, the item that was unavailable at the brick-and-mortar location 112 of the merchant 104. That is, Item B 118 may be fulfilled during the second time period $T_2$. Item B 118 may be fulfilled via a different fulfillment mode than that used to fulfill Item A 116. For example, the buyer 102 may pick up Item B 118 at a different brick-and-mortar location 122 of the merchant 104. As another example, an online store 124 of the merchant 104 may ship Item B 118 to the buyer 102. In some cases, the buyer 102 may return to the original brick-and-mortar location 112 during the second time period $T_2$ to pick up Item B 118 (e.g., if Item B is made available at the original brick-and-mortar location 112). That is, the term "mixed fulfillment transaction" may, in some cases, include transactions in which items are fulfilled via a same fulfillment mode but during different time periods.

The server 108 may receive (e.g., from the merchant device 106 and/or from one or more computing devices associated with the online store 124), during the second time period $T_2$, a second request to capture payment for Item B 118. Additionally or alternatively, the server 108 may receive an indication that Item B 118 has been fulfilled, i.e., the server 108 may receive an indication that the buyer 102 has received Item B 118 (e.g., from the different brick-and-mortar location 122 of the merchant 104 and/or from the online store 124 of the merchant 104). The server 108 may capture payment for Item B 118 at least partly in response to receiving the second request to capture payment for Item B 118 and/or receiving the indication that Item B 118 has been fulfilled.

In various implementations, the merchant device 106 (and/or the one or more computing devices associated with the online store 124) may send the second request to capture payment for Item B 118 without the buyer 102 having to tender the payment instrument 114 for authorization. Rather, the merchant device may be aware of the purchase ticket 110 and thus know that the payment instrument 114 has already been authorized for the cost of the transaction, which includes the cost of Item B 118. For example, the merchant device 106 may receive (e.g., from the buyer 102) an identifier of the buyer 102, and send the identifier to the server 108. In turn, the server 108 may determine, based at least in part on the identifier of the buyer 102, that the purchase ticket 110 is associated with the buyer 102 and/or the payment instrument 114 of the buyer 102.

The server 108 may update the purchase ticket 110. For instance, the server 108 may update the purchase ticket 110 to indicate that payment has been captured for Item B 118. As another example, the server 108 may update the purchase ticket 110 to indicate a remaining authorized amount on the payment instrument 114 for the transaction. As illustrated in FIG. 1, the purchase ticket 110 (corresponding to the second time period $T_2$) shows a line through Item A 116 and through Item B 118 to indicate that payment has been captured for both of these items. However, the purchase ticket 110 may track and/or indicate payment capture in any other suitable manner.

Figure 2:
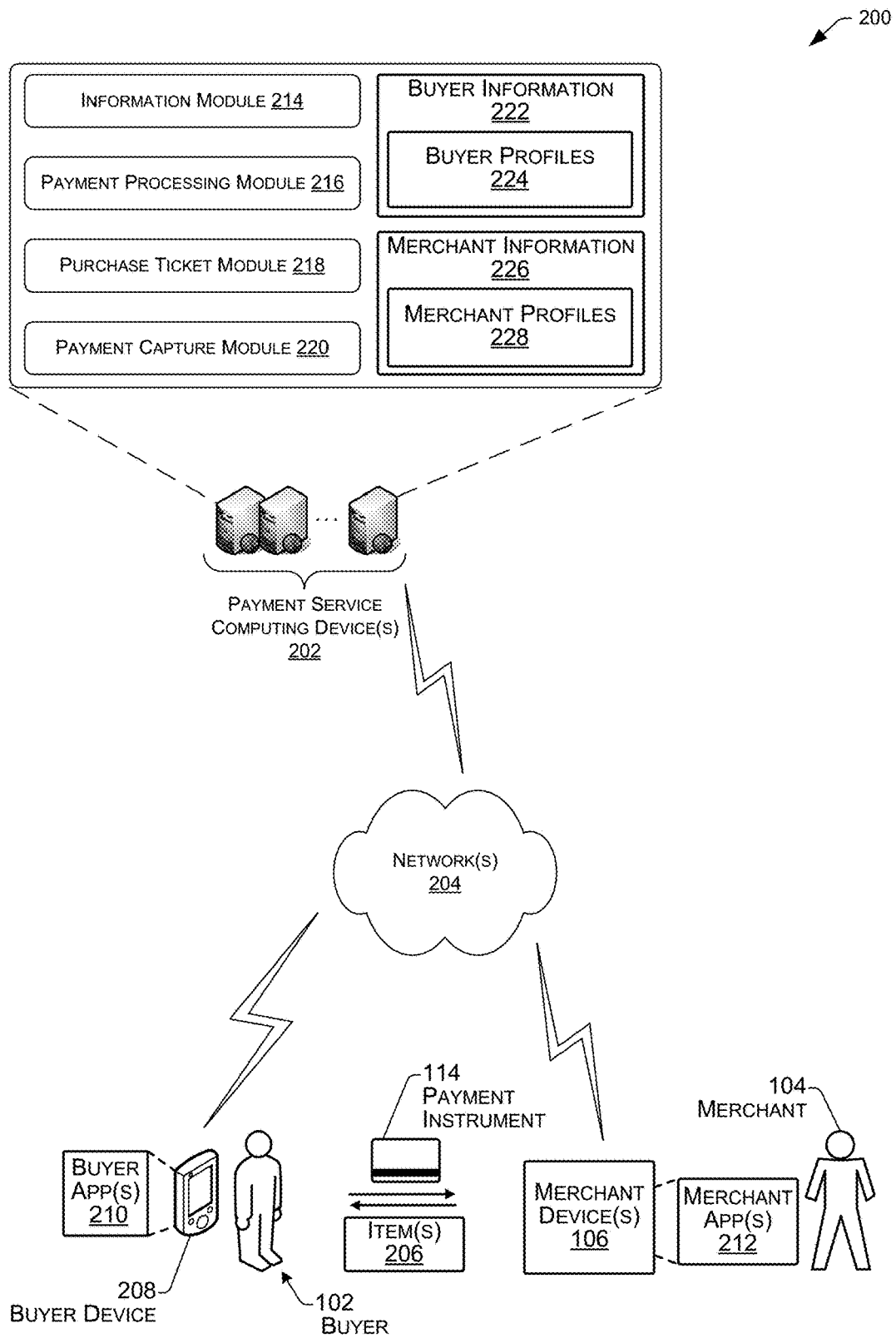
FIG. 2 illustrates an example environment that includes one or more payment service computing devices associated with a payment service. The payment service computing devices may facilitate implementation of intelligent capture techniques according to some implementations.

FIG. 2 illustrates an example environment 200 that includes one or more payment service computing devices 202 associated with a payment service. In some cases, the payment service computing devices may have some or all of the functionality of the server 108 described with reference to FIG. 1. The payment service computing devices 202 may interact with various devices over one or more networks 204 to receive and/or provide various information/data.

For instance, the payment service computing devices 202 may communicate with one or more merchant devices 106 associated with a merchant 104. In some cases, the merchant 104 may operate a merchant device 106 to engage in a transaction with a buyer 102. As discussed in FIG. 1, the buyer 104 may tender a payment instrument 114 to be authorized for the cost of one or more items 206. One or more of the items 206 may be available to be fulfilled at or around the time of the transaction, while one or more of the items 206 may be designated for fulfillment at a later time and/or via a different fulfillment mode.

In some examples, the buyer 102 may have a buyer device 208 that may execute one or more buyer applications 210. For instance, some buyers 102 may carry buyer device 208, such as smart phones, tablet computers, wearable computing devices, or the like, as further enumerated elsewhere herein, and some of these buyer devices 208 may have installed thereon the buyer application 210. The buyer application 210 may include electronic payment capability, which enables the buyer 102 to make a payment to the merchant 104 using the buyer application 210, rather than paying with a physical payment card, cash, check, or other payment instrument 114. The buyer application 210 may further enable the buyer 102 to check in with the particular merchant 104, e.g., at the merchant's store or prior to entering the merchant's store, such as to place an order for an item. For instance, the buyer 102 may be able to place an order for an item through the buyer application 210, may skip waiting in a line for ordering items, may pay for the transaction using the buyer application 210, and may proceed directly to an area of the merchant's store to pick up the ordered item.

As an example, the merchant 104 and the buyer 102 may conduct a transaction for multiple items 206. The merchant device 106 may comprise any sort of mobile or non-mobile device that includes one or more merchant applications 212 that execute on the merchant device 106. The merchant device 212 may provide point-of-sale (POS) functionality to the merchant device 106 to enable the merchant 104 to accept payments. The merchant application 212 may send transaction information to the payment service computing devices 202, e.g., as the transaction is being conducted at a brick-and-mortar location of the merchant 104. Of course, in other examples, such as if a particular merchant device 106 is processing transactions offline, the transaction information may be sent in a batch at a subsequent point in time.

The transaction information may include information regarding the time, place, and the amount of each respective transaction, information related to the items acquired, a type of payment instrument being used (e.g., cash, check, payment card, electronic payment), as well as additional information, such as buyer information associated with the buyer 102. For instance if a payment card is used, the transaction information can include data stored in the payment card, e.g., Track 1 data (cardholder name, card number and other card information). In addition, when completing the transaction a buyer 102 may sometimes provide a receipt email address for receiving a receipt through email. Other examples of transaction information that can be captured include detailed item information, e.g., an itemized listing of the items being acquired, the price being paid for each item, descriptors of the items (size, flavor, color, etc.), geolocation data indicating a geographic location of a particular transaction, online/offline card data, data describing the merchant 104, e.g., a merchant identifier, a merchant category code (MCC), any type of data that is received upon a buyer's authentication into a social network, if any, and various other types of information.

In various implementations, the payment service computing devices 202 may include an information module 214 configured to access, receive, send, track, parse, and/or store (or otherwise manage the storage of) information, such as the data 120 described with reference to FIG. 1. For instance, the information module 214 may provide the functionality for receiving requests from the merchant device 106 to authorize payment instruments and/or provide the functionality for receiving requests from the merchant device 106 to capture payments for items.

In some implementations, the payment service computing devices 202 may include a payment processing module 216. Among other things, the payment processing module 216 may provide the functionality for authorizing payment instruments. For instance, the payment processing module 216 may authorize a payment instrument for a cost of a mixed fulfillment transaction between the buyer 102 and the merchant 104.

According to various implementations, the payment service computing devices 202 may include a purchase ticket module 218 for generating and updating purchase tickets, such as the purchase ticket 110 described with reference to FIG. 1. For instance, the purchase ticket module 218 may generate a purchase ticket associated with multiple items in a mixed fulfillment transaction. In some cases, the purchase ticket module 218 may update the purchase ticket based at least in part on, and/or in response to, data received at the payment service computing devices 202. For example, the purchase ticket module 218 may update the purchase ticket based on one or more of transaction information, fulfillment information, authorization information, or capture information. The payment service computing devices 202 may send a purchase ticket and/or any information associated with the purchase ticket to one or more computing devices associated with the merchant 104, such as the merchant device 106, and/or the buyer device 208.

In various implementations, the payment service computing devices 202 may include a payment capture module 220 configured to capture payment in transactions. For instance, the payment capture module 220 may provide the functionality for carrying out a partial capture in a mixed fulfillment transaction, as described above with reference to FIG. 1.

In some examples, the payment service computing devices 202 may include buyer information 222 (e.g., one or more buyer profiles 224) and/or merchant information 226 (e.g., one or more merchant profiles 228). The buyer information 222 and/or the merchant information 226 may be utilized, for example, to associate a purchase ticket with a buyer and/or a merchant.

FIG. 3 is a flow diagram illustrating an example process 300 for generating a purchase ticket and intelligently capturing payment, as described in further detail above with reference to FIGS. 1 and 2. The process 300 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

At 302, the process 300 may authorize a payment instrument with respect to a cost of a transaction in which a holder of the payment instrument purchases multiple items from a merchant. For example, the process 300 may receive a request to authorize the payment instrument for the cost of the transaction, and authorize the payment instrument at least partly in response to receiving the request. In some cases, the process 300 may receive the request to authorize the payment instrument from a point-of-sale (POS) device associated with a brick-and-mortar location of the merchant. However, the process 300 may receive the request to authorize the payment instrument from any computing device associated with the merchant.

At 304, the process 300 may generate a purchase ticket associated with the multiple items of the transaction. The purchase ticket may include any information associated with the multiple items and/or the transaction. As non-limiting examples, the purchase ticket may include one or more of a total amount authorized on the payment instrument for the cost of the transaction, an amount authorized on the payment instrument for an individual item of the multiple items, a fulfillment mode corresponding to an individual item of the multiple items, a fulfillment status corresponding to whether an individual item of the multiple items has been fulfilled, or a capture status corresponding to whether payment has been captured with respect to an individual item of the multiple items.

At 306, the process 300 may, during a first time period, capture payment for a first portion of the cost of the transaction. For instance, the first portion of the cost of the transaction may correspond to a cost of a first item of the multiple items. In some cases, the process 300 may update the purchase ticket based at least in part on the captured payment for the first portion of the cost of the transaction. For example, the process 300 may update the purchase ticket such that the purchase ticket indicates a remaining authorized amount.

At 308, the process 300 may, during a second time period after the first time period, receive a request to capture payment for a second portion of the cost of the transaction. For instance, the second portion of the cost of the transaction may correspond to a cost of a second item of the multiple items. The process 300 may receive the request to authorize the payment instrument for the cost of the transaction from one or more first computing devices of the merchant, and receive the request to capture payment for the second portion of the cost of the transaction from one or more second computing devices of the merchant In some examples, the process 300 may receive the request to authorize the payment instrument for the cost of the transaction from a first point-of-sale (POS) device associated with a first brick-and-mortar location of the merchant, and receive the request to capture payment for the second portion of the cost of the transaction from a second POS device associated with a second, different brick-and-mortar location of the merchant In other examples, the process 300 may receive the request to authorize the payment instrument for the cost of the transaction from a POS device associated with a brick-and-mortar location of the merchant, and receive the request to capture payment for the second portion of the cost of the transaction from one or more computing devices associated with an online store of the merchant.

At 310, the process 300 may determine that the payment instrument has already been authorized with respect to the cost of the second item. For instance, the process 300 may receive, from one or more computing devices associated with the merchant, an identification associated with the holder of the payment instrument. The process 300 may determine, based at least in part on the identification associated with the holder of the payment instrument, that the holder is associated with the purchase ticket. Accordingly, the process 300 may determine, based at least in part on the purchase ticket, that the payment instrument has already been authorized with respect to the cost of the second item. Furthermore, the process 300 may send the purchase ticket to the one or more computing devices associated with the merchant.

At 312, the process 300 may capture payment for the second portion of the cost of the transaction. For example, the process 300 may capture payment for the second portion of the cost of the transaction at least partly in response to determining that the payment instrument has already been authorized with respect to the cost of the second item. In some cases, the process 300 may capture payment for the second portion of the cost of the transaction without again needing to authorize the payment instrument after the payment instrument has been authorized a first time with respect to the cost of the transaction.

Figure 4:
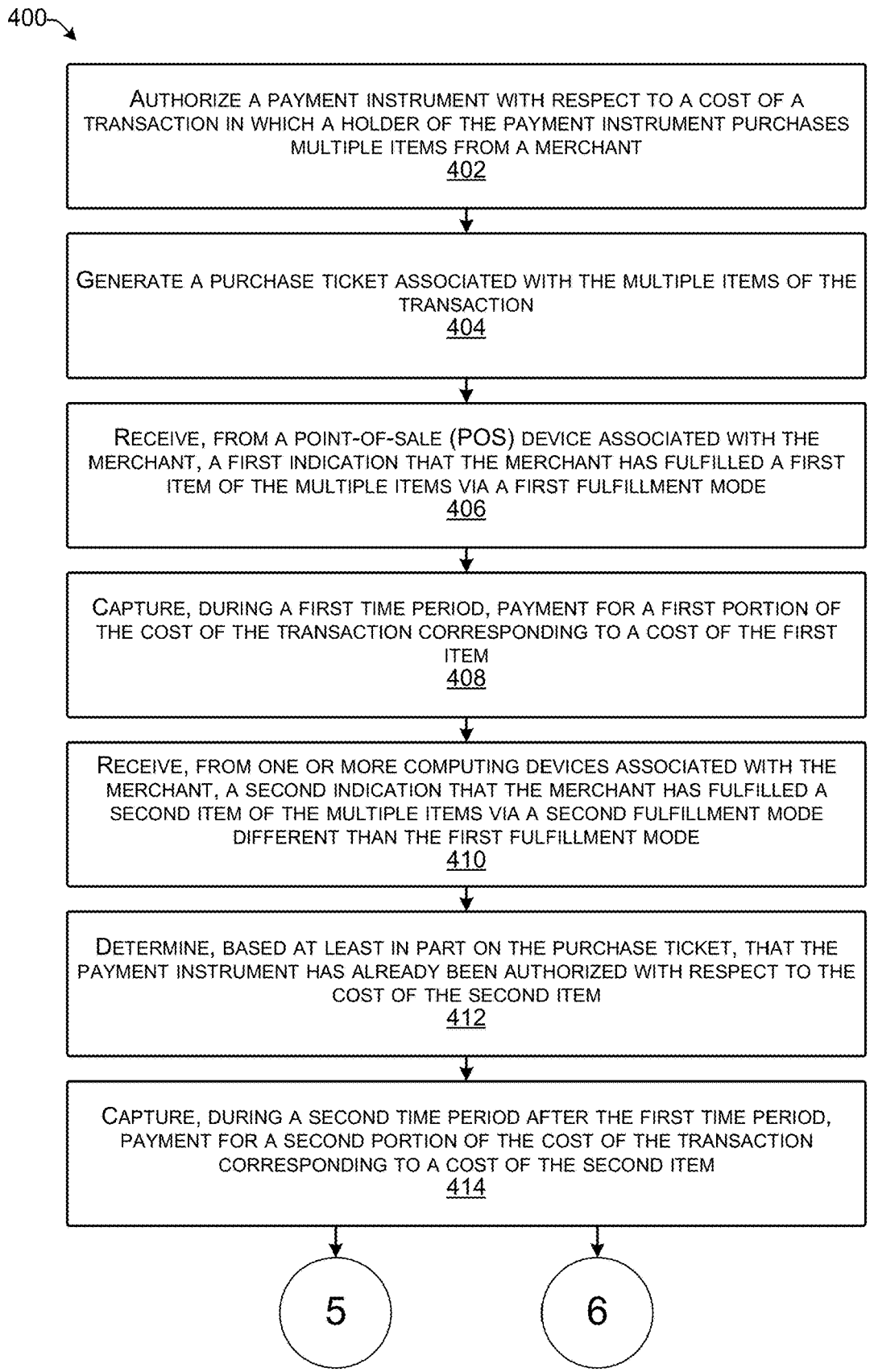
FIG. 4 is a flow diagram illustrating another example process for generating a purchase ticket and intelligently capturing payment according to some implementations.

FIG. 4 is a flow diagram illustrating another example process 400 for generating a purchase ticket and intelligently capturing payment, as described in further detail above with reference to FIGS. 1 and 2. At 402, the process 400 may authorize a payment instrument with respect to a cost of a transaction in which a holder of the payment instrument purchases multiple items from a merchant In some cases, the transaction for the multiple items may be a mixed fulfillment transaction. At 404, the process 400 may generate a purchase ticket associated with the multiple items of the transaction.

At 406, the process 400 may receive, from a point-of-sale (POS) device associated with the merchant, a first indication that the merchant has fulfilled a first item of the multiple items via a first fulfillment mode. In some examples, the first fulfillment mode may correspond to the first item being fulfilled by a first brick-and-mortar location of the merchant. However, the first fulfillment mode may be any other suitable fulfillment mode.

At 408, the process 400 may capture, during a first time period, payment for a first portion of the cost of the transaction corresponding to a cost of the first item. At 410, the process 400 may receive, from one or more computing devices associated with the merchant, a second indication that the merchant has fulfilled a second item of the multiple items via a second fulfillment mode different than the first fulfillment mode. In some examples, the second fulfillment mode may correspond to the second item being fulfilled by a second, different brick-and-mortar location of the merchant In other examples, the second fulfillment mode may correspond to the second item being fulfilled by an online store of the merchant.

At 412, the process 400 may determine, based at least in part on the purchase ticket, that the payment instrument has already been authorized with respect to the cost of the second item. At 414, the process 400 may capture, during a second time period after the first time period, payment for a second portion of the cost of the transaction corresponding to a cost of the second item.

Figure 5:
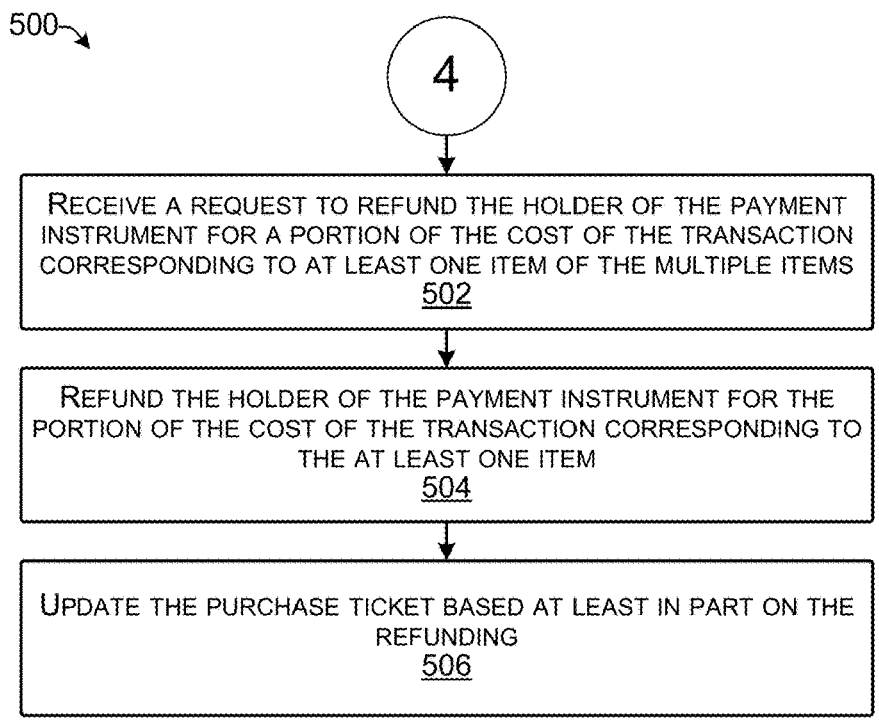
FIG. 5 is a flow diagram illustrating yet another example process for generating a purchase ticket and intelligently capturing payment in accordance with some implementations. This example process includes refunding a holder of a payment instrument and updating the purchase ticket.

FIG. 5 is a flow diagram illustrating yet another example process 500 for generating a purchase ticket and intelligently capturing payment in accordance with some implementations. This example process 500 includes refunding a holder of a payment instrument and updating the purchase ticket.

At 502, the process 500 may receive a request to refund the holder of the payment instrument for a portion of the cost of the transaction corresponding to at least one item of the multiple items. For instance, a holder of the payment instrument may desire to return an item of multiple items in a mixed fulfillment transaction. The holder of the payment instrument may therefore visit a brick-and-mortar location of the merchant, return the item, and request a refund. One or more computing devices associated with the merchant may send a request to payment service computing devices to process the refund.

At 504, the process 500 may refund the holder of the payment instrument for the portion of the cost of the transaction corresponding to the at least one item. The process 500 may identify a purchase ticket associated with the mixed fulfillment transaction. For instance, the process 500 may identify the purchase ticket based at least in part on an identifier of the holder of the payment instrument and/or an identifier of the payment instrument. However, it should be understood that the process 500 may identify the purchase based on any other suitable information. At 506, the process 600 may update the purchase ticket based at least in part on the refund made to the holder of the payment instrument.

Figure 6:
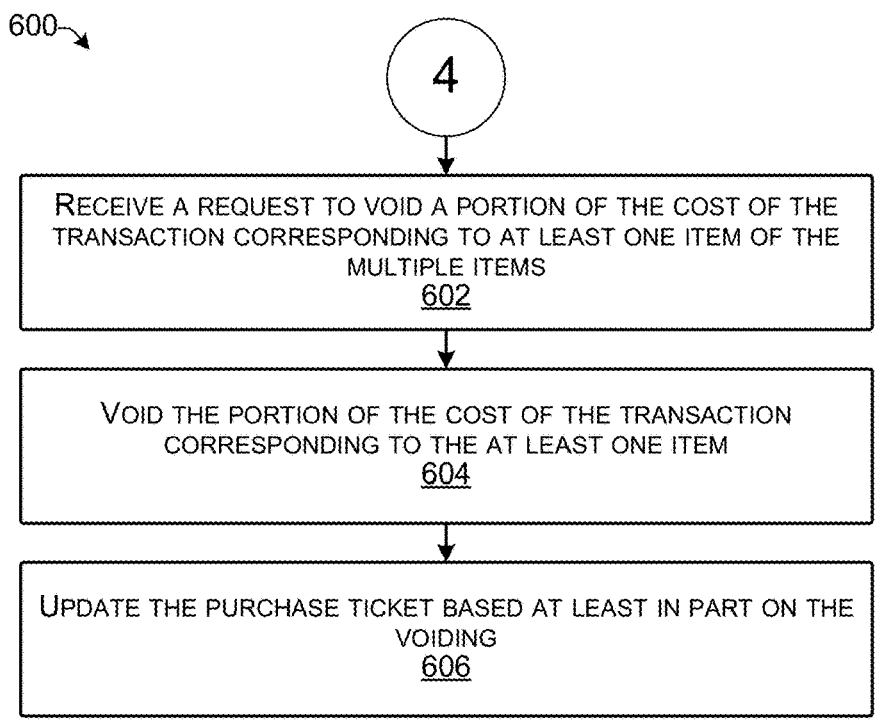
FIG. 6 is a flow diagram illustrating still yet another example process for generating a purchase ticket and intelligently capturing payment in accordance with some implementations. This example process includes voiding a portion of a cost of a transaction and updating the purchase ticket.

FIG. 6 is a flow diagram illustrating still yet another example process 600 for generating a purchase ticket and intelligently capturing payment in accordance with some implementations. This example process 600 includes voiding a portion of a cost of a transaction and updating the purchase ticket.

At 602, the process 600 may receive a request to void a portion of the cost of the transaction corresponding to at least one item of the multiple items. In some examples, a holder of the payment instrument used in a mixed fulfillment transaction may cancel fulfillment of an item. That is, the item may be designated to not be fulfilled. In some cases, the holder of the payment instrument may delay beyond a threshold amount of time to pick up an item at a brick-and-mortar location of the merchant, and/or the merchant may delay beyond the threshold amount of time to fulfill the item. In such cases, the process 300 may determine, based at least in part on the purchase ticket (which may indicate the threshold amount of time, an expiration time, or the like), that the item has expired.

At 604, the process 600 may void the portion of the cost of the transaction corresponding to the at least one item. For instance, the portion of the cost of the transaction corresponding to the at least one item may be voided at least partly in response to determining that fulfillment of the at least one item has been canceled and/or determining that the at least one item has expired. At 606, the process 600 may update the purchase ticket based at least in part on the portion of the cost of the transaction corresponding to the at least one item being voided.

Figure 7:
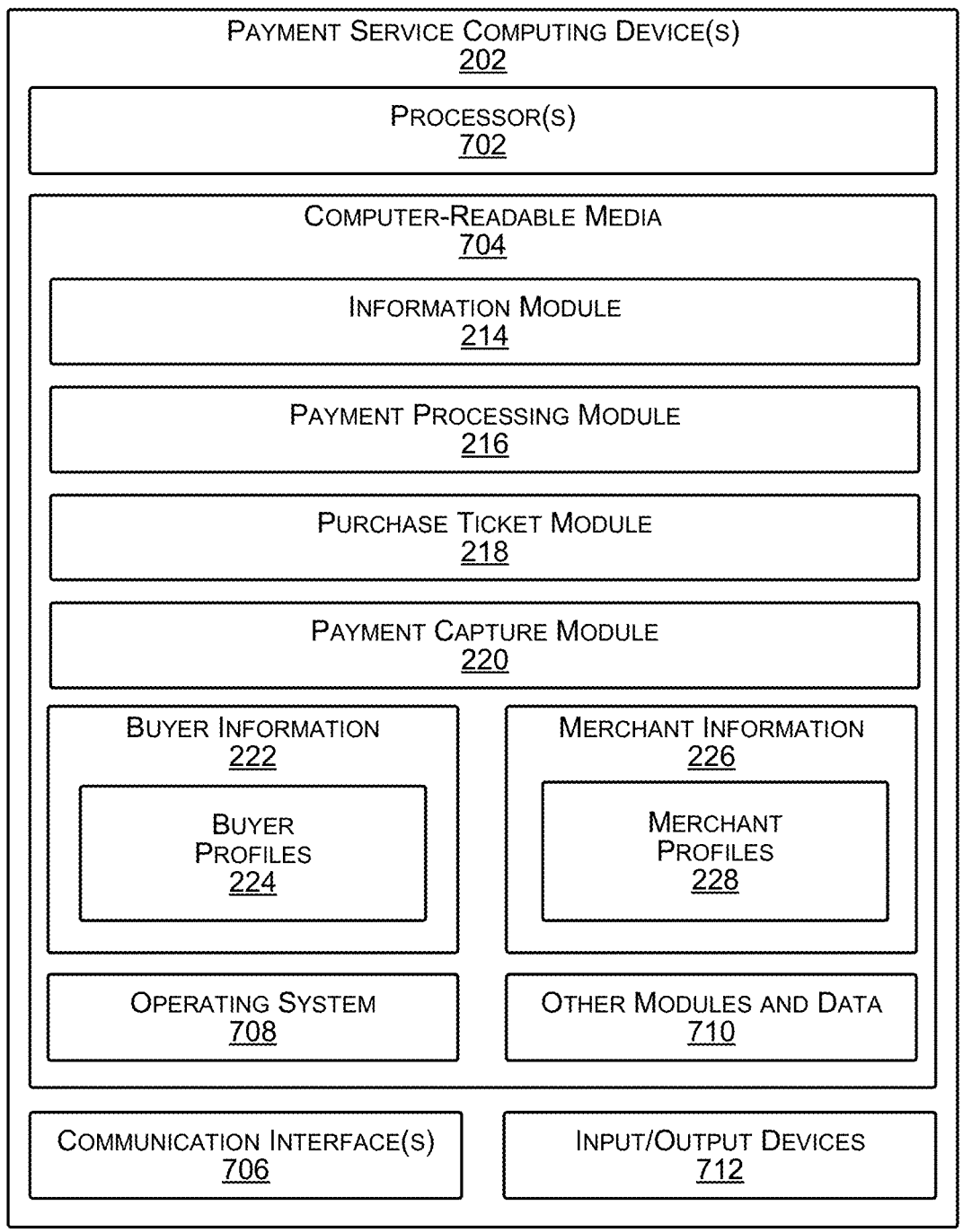
FIG. 7 illustrates select components of a payment service computing device according to some implementations.

FIG. 7 illustrates select example components of the payment service computing device 202 according to some implementations. The payment service computing device 202 may be operated by a service provider that provides the payment service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the payment service computing device 202 as being present in a single location, these components and data may alternatively be distributed across different computing devices and different locations in any manner Consequently, the functions may be implemented by one or more payment service computing devices 202, with the various functionality described above distributed in various ways across the different computing devices. Multiple payment service computing devices 202 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each payment service computing device 202 may include one or more processors 702, one or more computer-readable media 704, and one or more communication interfaces 706. Each processor 702 may be a single processing unit or a number of processing units, and may include single or multiple computing units or multiple processing cores. The processor(s) 702 can be implemented as one or more microprocessors, microcomputers, microcontrollers, digital signal processors, central processing units, state machines, logic circuitries, and/or any devices that manipulate signals based on operational instructions. For instance, the processor(s) 702 may be one or more hardware processors and/or logic circuits of any suitable type specifically programmed or configured to execute the algorithms and processes described herein. The processor(s) 702 can be configured to fetch and execute computer-readable instructions stored in the computer-readable media 704, which can program the processor(s) 702 to perform the functions described herein.

The computer-readable media 704 may include volatile and nonvolatile memory and/or removable and non-removable media implemented in any type of technology for storage of information, such as computer-readable instructions, data structures, program modules, or other data. Such computer-readable media 704 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the payment service computing device 202, the computer-readable media 704 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 704 may be used to store any number of functional components that are executable by the processors 702. In many implementations, these functional components comprise instructions or programs that are executable by the processors 702 and that, when executed, specifically configure the one or more processors 702 to perform the actions attributed above to the payment service computing device 202. Functional components stored in the computer-readable media 704 may include the information module 214, the payment processing module 216, the purchase ticket module 218, and the payment capture module 220. Additional functional components stored in the computer-readable media 704 may include an operating system 708 for controlling and managing various functions of the payment service computing device 202.

In addition, the computer-readable media 704 may store data used for performing the operations described herein. Thus, the computer-readable media 704 may store the buyer information 222, including the buyer profiles 224, and the merchant information 226, including the merchant profiles 228. The payment service computing device 202 may also include or maintain other functional components and data, such as other modules and data 710, which may include programs, drivers, etc., and the data used or generated by the functional components. Further, the payment service computing device 202 may include many other logical, programmatic and physical components, of which those described above are merely examples that are related to the discussion herein.

The communication interface(s) 706 may include one or more interfaces and hardware components for enabling communication with various other devices, such as over the network(s) 204. For example, communication interface(s) 706 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The payment service computing device 202 may further be equipped with various input/output (I/O) devices 712. Such I/O devices 712 may include a display, various user interface controls (e.g., buttons, joystick, keyboard, mouse, touch screen, etc.), audio speakers, connection ports and so forth.

Figure 8:
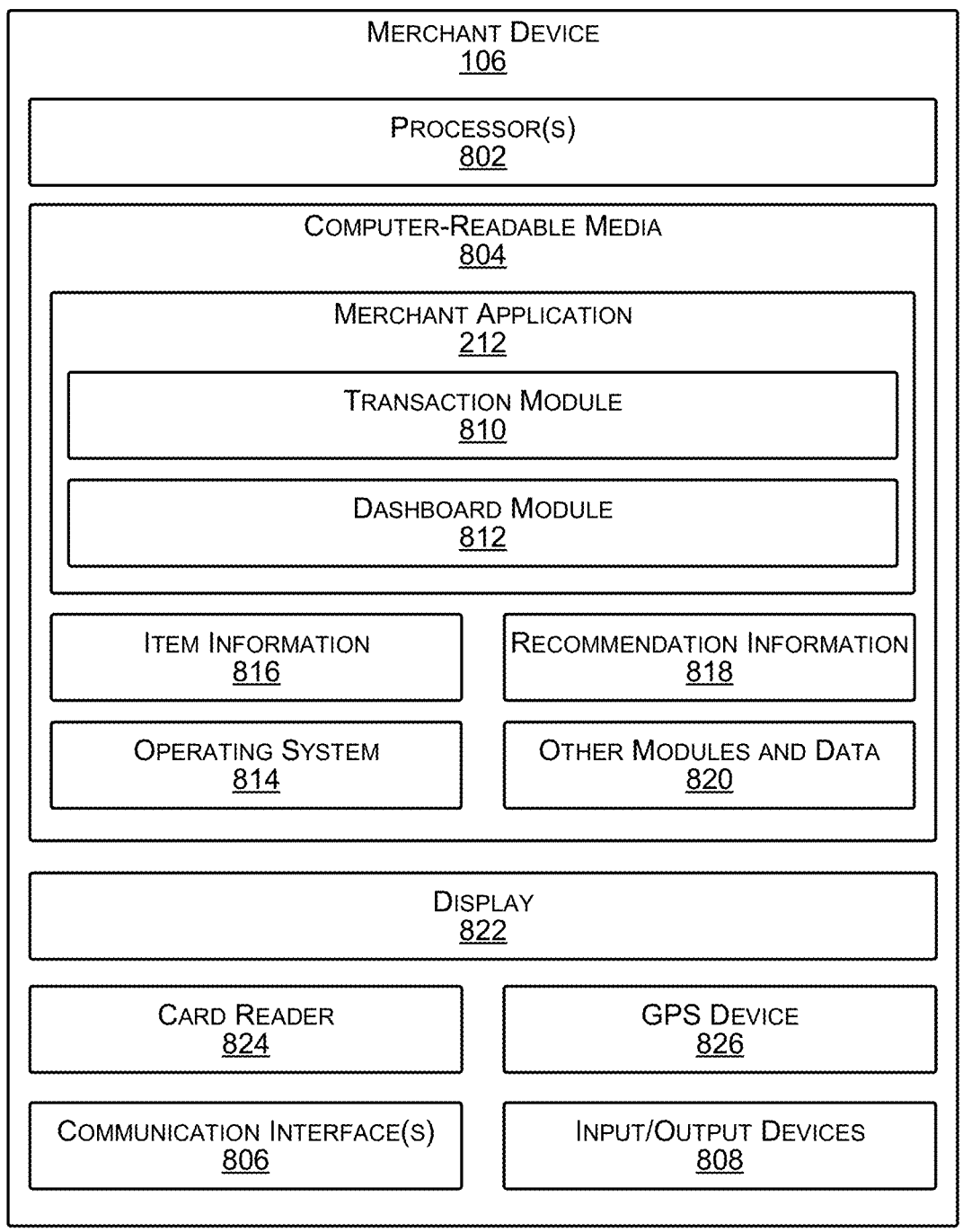
FIG. 8 illustrates select components of a merchant device according to some implementations.

FIG. 8 illustrates select example components of an example merchant device 106 according to some implementations. The merchant device 106 may be any suitable type of computing device, e.g., portable, semi-portable, semi-stationary, or stationary. Some examples of the merchant device 106 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 106 includes at least one processor 802, one or more computer-readable media 804, one or more communication interfaces 806, and one or more input/output (I/O) devices 808. Each processor 802 may itself comprise one or more processors or processing cores. For example, the processor 802 can be implemented as one or more microprocessors, microcomputers, microcontrollers, digital signal processors, central processing units, state machines, logic circuitries, and/or any devices that manipulate signals based on operational instructions. In some cases, the processor 802 may be one or more hardware processors and/or logic circuits of any suitable type specifically programmed or configured to execute the algorithms and processes described herein. The processor 802 can be configured to fetch and execute computer-readable processor-executable instructions stored in the computer-readable media 804.

Depending on the configuration of the merchant device 106, the computer-readable media 804 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 804 may include, but is not limited to, RAM, ROM, EEPROM, flash memory, solid-state storage, magnetic disk storage, optical storage, and/or other computer-readable media technology. Further, in some cases, the merchant device 106 may access external storage, such as RAID storage systems, storage arrays, network attached storage, storage area networks, cloud storage, or any other medium that can be used to store information and that can be accessed by the processor 802 directly or through another computing device or network. Accordingly, the computer-readable media 804 may be computer storage media able to store instructions, modules or components that may be executed by the processor 802. Further, when mentioned, non-transitory computer-readable media exclude media such as energy, carrier signals, electromagnetic waves, and signals per se.

The computer-readable media 804 may be used to store and maintain any number of functional components that are executable by the processor 802. In some implementations, these functional components comprise instructions or programs that are executable by the processor 802 and that, when executed, implement operational logic for performing the actions and services attributed above to the merchant device 106. Functional components of the merchant device 106 stored in the computer-readable media 804 may include the merchant application 212. In this example, the merchant application 212 includes a transaction module 810 and a dashboard module 812. For example, the transaction module 810 may present an interface, such as a payment interface, as discussed above, to enable the merchant to conduct transactions, receive payments, and so forth, as well as for communicating with the payment service computing devices 202 for processing payments and sending transaction information. Further, the dashboard module 812 may present a setup interface to enable the merchant to setup items, such as for adding new items or modifying information for existing items. The dashboard module 812 may further enable the merchant to manage the merchant's account, the merchant profile, merchant preferences, view saved or new information, and the like. Additional functional components may include an operating system 814 for controlling and managing various functions of the merchant device 106 and for enabling basic user interactions with the merchant device 106.

In addition, the computer-readable media 804 may also store data, data structures and the like, that are used by the functional components. For example, data stored by the computer-readable media 804 may include item information 816 that includes information about the items offered by the merchant, which may include a list of items currently available from the merchant, images of the items, descriptions of the items, prices of the items, and so forth. Furthermore, the computer-readable media 804 may have stored thereon recommendation information 818 that has been received from the payment service provider and stored at least temporarily, or the like. Depending on the type of the merchant device 106, the computer-readable media 804 may also optionally include other functional components and data, such as other modules and data 820, which may include programs, drivers, etc., and the data used or generated by the functional components. Further, the merchant device 106 may include many other logical, programmatic and physical components, of which those described are merely examples that are related to the discussion herein.

The communication interface(s) 806 may include one or more interfaces and hardware components for enabling communication with various other devices, such as over the network(s) 204 or directly. For example, communication interface(s) 806 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 8 further illustrates that the merchant device 106 may include a display 822 mentioned above. Depending on the type of computing device used as the merchant device 106, the display 822 may employ any suitable display technology. For example, the display 822 may be a liquid crystal display, a plasma display, a light-emitting diode display, an OLED (organic light-emitting diode) display, an electronic paper display, or any other suitable type of display able to present digital content thereon. In some examples, the display 822 may have a touch sensor associated with the display 822 to provide a touchscreen display configured to receive touch inputs for enabling interaction with a graphic interface presented on the display 822. Accordingly, implementations herein are not limited to any particular display technology. Alternatively, in some examples, the merchant device 106 may not include the display 822, and information may be presented by other means, such as aurally.

The merchant device 106 may further include the one or more I/O devices 808. The I/O devices 808 may include speakers, a microphone, a camera, and various user controls (e.g., buttons, a joystick, a keyboard, a keypad, etc.), a haptic output device, and so forth.

In addition, the merchant device 106 may include or may be connectable to a card reader 824. In some examples, the card reader 824 may plug in to a port in the merchant device 106, such as a microphone/headphone port, a data port, or other suitable port. The card reader 824 may include a read head for reading a magnetic strip of a payment card, and further may include encryption technology for encrypting the information read from the magnetic strip. Alternatively, numerous other types of card readers 824 may be employed with the merchant devices 106 herein, depending on the type and configuration of the merchant device 106.

Other components included in the merchant device 106 may include various types of sensors, which may include a GPS device 826 able to indicate location information, as well as other sensors (not shown) such as an accelerometer, gyroscope, compass, proximity sensor, and the like. Additionally, the merchant device 106 may include various other components that are not shown, examples of which include removable storage, a power source, such as a battery and power control unit, and so forth.

Figure 9:
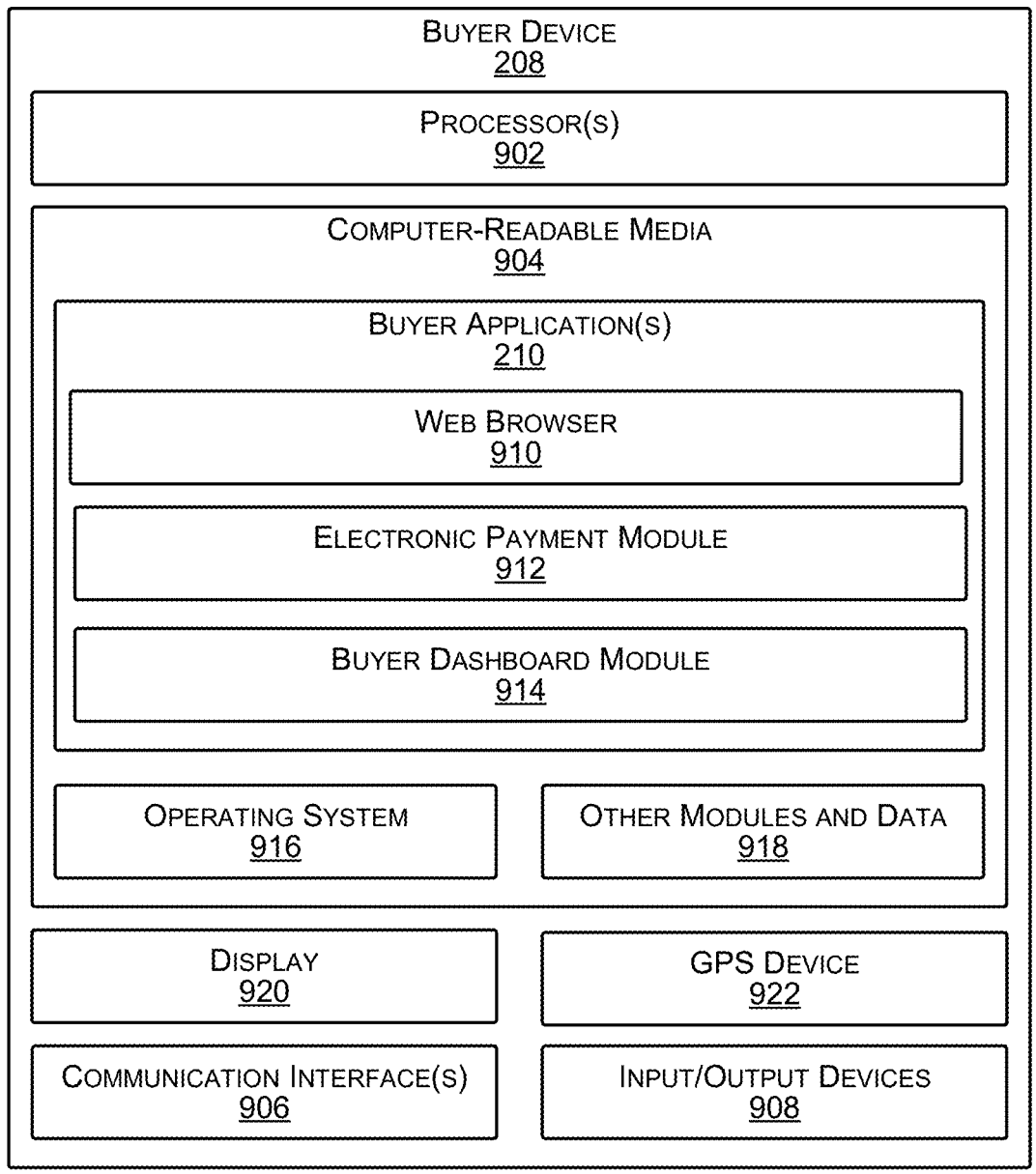
FIG. 9 illustrates select components of a buyer device according to some implementations.

FIG. 9 illustrates select example components of the buyer device 208 that may implement the functionality described above according to some examples. The buyer device 208 may be any of a number of different types of computing devices, including portable computing devices. Some examples of the buyer device 208 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 9, the buyer device 208 includes components such as at least one processor 902, one or more computer-readable media 904, the one or more communication interfaces 906, and one or more input/output (I/O) devices 908. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the computer-readable media 904.

Depending on the configuration of the buyer device 208, the computer-readable media 904 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 904 may include, but is not limited to, RAM, ROM, EEPROM, flash memory, solid-state storage, magnetic disk storage, optical storage, and/or other computer-readable media technology. Further, in some cases, the buyer device 208 may access external storage, such as RAID storage systems, storage arrays, network attached storage, storage area networks, cloud storage, or any other medium that can be used to store information and that can be accessed by the processor 902 directly or through another computing device or network. Accordingly, the computer-readable media 904 may be computer storage media able to store instructions, modules or components that may be executed by the processor 902. Further, when mentioned, non-transitory computer-readable media exclude media such as energy, carrier signals, electromagnetic waves, and signals per se.

The computer-readable media 904 may be used to store and maintain any number of functional components that are executable by the processor 902. In some implementations, these functional components comprise instructions or programs that are executable by the processor 902 and that, when executed, implement operational logic for performing the actions and services attributed above to the buyer device 208. Functional components of the buyer device 208 stored in the computer-readable media 904 may include the buyer application(s) 210, as discussed above. In this example, the buyer applications 210 include a web browser 910, an electronic payment module 912 that provides functionality allowing the buyer to make electronic payments, and a buyer dashboard module 914. For example, the buyer dashboard module 914 may present the buyer with an interface for managing the buyer's account, changing information, changing preferences, and so forth. Additional functional components may include an operating system 916 for controlling and managing various functions of the buyer device 208 and for enabling basic user interactions with the buyer device 208.

In addition, the computer-readable media 904 may also store data, data structures and the like, that are used by the functional components. Depending on the type of the buyer device 208, the computer-readable media 904 may also optionally include other functional components and data, such as other modules and data 918, which may include applications, programs, drivers, etc., and the data used or generated by the functional components. Further, the buyer device 208 may include many other logical, programmatic and physical components, of which those described are merely examples that are related to the discussion herein.

The communication interface(s) 906 may include one or more interfaces and hardware components for enabling communication with various other devices, such as over the network(s) 204 or directly. For example, communication interface(s) 906 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 9 further illustrates that the buyer device 208 may include a display 920. Depending on the type of computing device used as the buyer device 208, the display 920 may employ any suitable display technology. For example, the display 920 may be a liquid crystal display, a plasma display, a light-emitting diode display, an OLED (organic light-emitting diode) display, an electronic paper display, or any other suitable type of display able to present digital content thereon. In some examples, the display 920 may have a touch sensor associated with the display 920 to provide a touchscreen display configured to receive touch inputs for enabling interaction with a graphic interface presented on the display 920. Accordingly, implementations herein are not limited to any particular display technology. Alternatively, in some examples, the buyer device 208 may not include a display.

The buyer device 208 may further include the one or more I/O devices 908. The I/O devices 908 may include speakers, a microphone, a camera, and various user controls (e.g., buttons, a joystick, a keyboard, a keypad, etc.), a haptic output device, and so forth.

Other components included in the buyer device 208 may include various types of sensors, which may include a GPS device 922 able to indicate location information, as well as other sensors (not shown) such as an accelerometer, gyroscope, compass, proximity sensor, and the like. Additionally, the buyer device 208 may include various other components that are not shown, examples of which include removable storage, a power source, such as a battery and power control unit, and so forth.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors; and
one or more computer-readable media storing instructions that, when executed by the one or more processors, cause the one or more processors to perform operations comprising:
receiving, at one or more servers associated with a payment processing service and from a device associated with a merchant, a request to authorize a payment instrument for a total cost of a transaction in which a customer purchases multiple items from the merchant, wherein the device is associated with point-of-sale functionality for generating transaction data associated with at least the transaction and transmitting the transaction data to the payment processing service for processing payment for the total cost of the transaction;
responsive to receiving the request, generating, by the one or more servers, a purchase ticket associated with the multiple items of the transaction, the purchase ticket indicating a total amount authorized on the payment instrument for the transaction;
capturing, by the one or more servers and based at least in part on sending a capture request to a payment network, payment for a portion of the total cost of the transaction corresponding to a cost associated with at least one item of the multiple items, wherein the portion of the total cost of the transaction is captured via a capture request that corresponds with fulfillment of the at least one item; and
updating, by the one or more servers and based at least in part on the payment, the purchase ticket such that the purchase ticket indicates a remaining amount authorized on the payment instrument for the transaction, wherein at least a portion of the remaining amount is captured by one or more additional capture requests that correspond with fulfillment of one or more remaining items of the multiple items.

2. The system as recited in claim 1, the operations further comprising:
receiving an additional request to refund an additional portion of the total cost of the transaction, the additional portion corresponding to an additional cost associated with at least one additional item of the multiple items;
refunding the customer for the additional portion of the total cost of the transaction; and
updating the purchase ticket based at least in part on refunding the customer.

3. The system as recited in claim 1, the operations further comprising:
receiving an additional request to void an additional portion of the total cost of the transaction, the additional portion corresponding to an additional cost associated with at least one additional item of the multiple items;
voiding the additional portion of the total cost of the transaction; and
updating the purchase ticket based at least in part on voiding the additional portion.

4. The system as recited in claim 3, wherein capturing the payment for the portion of the total cost of the transaction occurs during a first time period, and wherein receiving the additional request to void the additional portion of the total cost of the transaction occurs during a second time period.

5. The system as recited in claim 1, the operations further comprising:
determining, based at least in part on the purchase ticket, that at least one additional item of the multiple items has expired;
voiding, based at least in part on determining that the at least one additional item has expired, an additional portion of the total cost of the transaction, the additional portion corresponding to an additional cost associated with the at least one additional item; and
updating the purchase ticket based at least in part on voiding the additional portion.

6. The system as recited in claim 1, the operations further comprising:
receiving an additional request to capture an additional payment for an additional portion of the total cost of the transaction, the additional portion corresponding to an additional cost associated with at least one remaining item of the one or more remaining items;

determining, based at least in part on the purchase ticket, that the payment instrument has already been authorized with respect to the additional cost of the at least one remaining item; and capturing, via an additional capture request of the one or more additional capture requests, the additional payment for the additional portion of the total cost of the transaction.

7. The system as recited in claim 6, wherein the at least one item is fulfilled via a first fulfillment mode, and wherein the at least one remaining item is fulfilled via a second fulfillment mode that is different than the first fulfillment mode.

8. The system as recited in claim 1, the operations further comprising updating the purchase ticket to indicate at least one of:

that the at least one item has been fulfilled; and that at least one remaining item of the one or more remaining items has yet to be fulfilled.

9. A method, implemented at least in part by one or more server computing devices of a merchant, the method comprising:

receiving, from a device associated with the merchant, a request to authorize a payment instrument for a total cost of a transaction in which a customer purchases multiple items from the merchant;

based at least in part on receiving the request, generating a purchase ticket associated with the multiple items of the transaction, the purchase ticket indicating at least a total amount authorized on the payment instrument for the transaction;

capturing payment for a portion of the total cost of the transaction, corresponding to a cost associated with at least one item of the multiple items; and updating, based at least in part on the payment, the purchase ticket such that the purchase ticket indicates a remaining amount authorized on the payment instrument for the transaction, wherein at least a portion of the remaining amount is captured by one or more additional capture requests.

10. The method as recited in claim 9, further comprising:

receiving an additional request to refund an additional portion of the total cost of the transaction, the additional portion corresponding to an additional cost associated with at least one additional item of the multiple items;

refunding the customer for the additional portion of the total cost of the transaction; and updating the purchase ticket based at least in part on refunding the customer.

11. The method as recited in claim 9, further comprising:

receiving an additional request to void an additional portion of the total cost of the transaction, the additional portion corresponding to an additional cost associated with at least one additional item of the multiple items;

voiding the additional portion of the total cost of the transaction; and updating the purchase ticket based at least in part on voiding the additional portion.

12. The method as recited in claim 9, further comprising:

determining, based at least in part on the purchase ticket, that at least one additional item of the multiple items has expired;

voiding, based at least in part on determining that the at least one additional item has expired, an additional portion of the total cost of the transaction, the additional portion corresponding to an additional cost associated with the at least one additional item; and updating the purchase ticket based at least in part on voiding the additional portion.

13. The method as recited in claim 9, further comprising:

receiving an additional request to capture an additional payment for an additional portion of the total cost of the transaction, the additional portion corresponding to an additional cost associated with at least one remaining item of the one or more remaining items;

determining, based at least in part on the purchase ticket, that the payment instrument has already been authorized with respect to the additional cost of the at least one remaining item; and capturing, via an additional capture request of the one or more additional capture requests, the additional payment for the additional portion of the total cost of the transaction.

14. The method as recited in claim 13, wherein the at least one item is fulfilled via a first fulfillment mode, and wherein the at least one remaining item is fulfilled via a second fulfillment mode that is different than the first fulfillment mode.

15. The method as recited in claim 9, further comprising updating the purchase ticket to indicate at least one of:

that the at least one item has been fulfilled; and that at least one remaining item of the one or more remaining items has yet to be fulfilled.

16. The method as recited in claim 9, wherein the device associated with the merchant comprises:

a point-of-sale (POS) device associated with a physical location of the merchant, wherein the POS device is specially configured via an application installed thereon; or a computing device associated with an online store of the merchant.

17. One or more computing devices comprising:

one or more processors; and one or more computer-readable media storing instructions that, when executed by the one or more processors, cause the one or more processors to perform operations comprising:

storing a purchase ticket associated with a transaction between a customer and a merchant, the purchase ticket indicating at least a total amount authorized on a payment instrument for multiple items purchased by the customer during the transaction;

receiving, from a device associated with the merchant, a request to capture payment for a portion of the total amount authorized on the payment instrument, the portion corresponding to a cost associated with at least one item of the multiple items;

capturing the payment for the portion of the total amount authorized on the payment instrument; and updating, based at least in part on the payment, the purchase ticket such that the purchase ticket indicates (i) that the at least one item has been fulfilled and (ii) a remaining amount authorized on the payment instrument for the transaction, wherein at least a portion of the remaining amount is captured by one or more additional capture requests.

18. The one or more computing devices as recited in claim 17, the operations further comprising:

receiving an additional request to refund an additional portion of the total amount authorized on the payment instrument, the additional portion corresponding to an additional cost associated with at least one additional item of the multiple items;

refunding the customer for the additional portion of the total amount; and updating the purchase ticket based at least in part on refunding the customer.

19. The one or more computing devices as recited in claim 17, the operations further comprising:

receiving an additional request to void an additional portion of the total amount authorized on the payment instrument, the additional portion corresponding to an additional cost associated with at least one additional item of the multiple items;

voiding the additional portion of the total amount; and updating the purchase ticket based at least in part on voiding the additional portion.

20. The one or more computing devices as recited in claim 17, the operations further comprising one of:

receiving, from the device associated with the merchant, a first request to authorize the payment instrument for the total cost amount of the transaction, wherein the device is a point-of-sale (POS) device associated with a physical location of the merchant; or receiving, from the device associated with the merchant, a second request to authorize the payment instrument for the total cost amount of the transaction, wherein the device is associated with an online store of the merchant.

* * * * *

UNITED STATES PATENT AND TRADEMARK OFFICE
CERTIFICATE OF CORRECTION

PATENT NO. : 10,755,275 B1
APPLICATION NO. : 15/662998
DATED : August 25, 2020
INVENTOR(S) : Mark Jen et al.

It is certified that error appears in the above-identified patent and that said Letters Patent is hereby corrected as shown below:

In the Claims

Column 23, Line 24, Claim 20 change "cost amount" to --amount--.

Column 23, Line 29, Claim 20 change "cost amount" to --amount--.

Signed and Sealed this
Twentieth Day of October, 2020

Andrei Iancu
*Director of the United States Patent and Trademark Office*